United States Patent [19]
Papich et al.

[11] Patent Number: 5,669,436
[45] Date of Patent: Sep. 23, 1997

[54] METHOD OF CONTINUOUSLY CASTING COMPOSITE STRIP

[75] Inventors: Kevin S. Papich, Lebanon; Ronald Bachowski, Murrysville; Stephen F. Baumann, Pittsburgh; Robert A. Cargnel, Export; Gerald E. Carkin, Tarentum; Donald J. Clements, Apollo; Ronald W. Gunkel, Lower Burrell; William H. Hoffman, Palmyra; Larry G. McKinney, Lebanon; A. Victor Pajerski, Upper Burrell Township, Westmoreland County; John J. Palko, Palmyra; Edward P. Patrick, Jr., Murrysville; Stephen J. Rennekamp, Irwin, all of Pa.; Philip C. Scheble, Albemarle, N.C.; William R. Sharkins, Curtisville, Pa.; Frank P. Swigon, Lebanon, Pa.; William G. Truckner, Avonmore, Pa.

[73] Assignee: Aluminum Company of America, Pittsburgh, Pa.

[21] Appl. No.: 485,297

[22] Filed: Jun. 7, 1995

Related U.S. Application Data

[60] Division of Ser. No. 989,205, Dec. 10, 1992, Pat. No. 5,476,725, which is a continuation-in-part of Ser. No. 670,576, Mar. 18, 1991, Pat. No. 5,187,046.

[51] Int. Cl.$^6$ ................................ B22D 11/06
[52] U.S. Cl. .................. 164/461; 164/476; 164/477; 164/480
[58] Field of Search .................. 164/461, 476, 164/480, 100, 46, 419, 98, 76.1, 477

[56] References Cited

U.S. PATENT DOCUMENTS

| | | |
|---|---|---|
| 1,749,314 | 3/1930 | Carbis . |
| 1,865,089 | 6/1932 | Dix, Jr. . |
| 1,997,165 | 4/1935 | Brown . |
| 2,058,448 | 10/1936 | Hazelett ................ 164/476 X |
| 2,128,942 | 9/1938 | Hudson . |
| 2,128,943 | 9/1938 | Hudson . |
| 2,195,613 | 4/1940 | Chace . |
| 2,234,340 | 3/1941 | Gillis ................ 29/33 |
| 2,268,565 | 1/1942 | Chace . |
| 2,354,006 | 7/1944 | Gauthier . |
| 2,693,012 | 11/1954 | Harris et al. . |
| 2,743,516 | 5/1956 | Forrester et al. . |
| 2,821,014 | 1/1958 | Miller . |

(List continued on next page.)

FOREIGN PATENT DOCUMENTS

| | | |
|---|---|---|
| 1364758 | 5/1964 | France . |
| 2532869 | 8/1983 | France . |
| 3829423 | 5/1989 | Germany . |
| 49-093147 | of 1974 | Japan . |
| 57-041344 | 3/1982 | Japan . |
| 57-184574 | 11/1982 | Japan . |
| 58-68459 | 4/1983 | Japan . |
| 59-185553 | 10/1984 | Japan . |
| 60-110836 | of 1985 | Japan . |
| 60-033346 | 2/1985 | Japan . |
| 60-92052 | 5/1985 | Japan . |
| 60-205195 | 10/1985 | Japan . |
| 60-211056 | 10/1985 | Japan . |

(List continued on next page.)

*Primary Examiner*—J. Reed Batten, Jr.
*Attorney, Agent, or Firm*—William J. O'Rourke, Jr.; E. L. Levine

[57] ABSTRACT

A composite metallurgical product includes a roll cast aluminum alloy core and a filler material bonded on the core. Assemblies joined by filler material are formed from this product by heating to flow the filler material into joints and subsequent solidification of the filler material in the joints. The composite product is made in several ways, including lamination at roll caster rolls, and lamination or thermal spraying at the exit side of a roll caster. The invention additionally provides for an angulation rolling method for varying percent of cladding on the composite, and a high-manganese aluminum alloy useful as core material in brazing sheet clad with aluminum-silicon brazing alloy.

27 Claims, 14 Drawing Sheets

U.S. PATENT DOCUMENTS

| | | |
|---|---|---|
| 3,168,381 | 2/1965 | Finnegan et al. . |
| 3,321,828 | 5/1967 | Miller . |
| 3,390,970 | 7/1968 | Bothwell . |
| 3,406,737 | 10/1968 | Duflot et al. .......................... 164/100 X |
| 3,742,585 | 7/1973 | Wentzell ................................ 164/46 X |
| 4,098,957 | 7/1978 | Vernam et al. ......................... 428/654 |
| 4,146,163 | 3/1979 | Anderson et al. ...................... 228/158 |
| 4,146,164 | 3/1979 | Anderson et al. ...................... 228/158 |
| 4,150,980 | 4/1979 | Imaizumi et al. . |
| 4,172,548 | 10/1979 | Nakamura .............................. 228/183 |
| 4,213,558 | 7/1980 | Hirobe et al. ........................... 228/176 |
| 4,224,978 | 9/1980 | Klein ....................................... 164/461 |
| 4,357,397 | 11/1982 | Baba et al. .............................. 428/654 |
| 4,560,625 | 12/1985 | Kaifu et al. ............................. 428/654 |
| 4,586,964 | 5/1986 | Finnegan et al. . |
| 4,649,087 | 3/1987 | Scott et al. .............................. 428/654 |
| 4,691,758 | 9/1987 | Palmer .................................... 164/461 |
| 4,828,794 | 5/1989 | Scott et al. .............................. 420/529 |
| 4,828,936 | 5/1989 | Toma et al. ............................. 428/650 |
| 4,906,534 | 3/1990 | Bekki et al. ............................. 428/654 |
| 5,021,106 | 6/1991 | Iwai et al. ............................... 148/437 |
| 5,037,707 | 8/1991 | Fortin et al. ............................ 428/654 |
| 5,041,343 | 8/1991 | Fortin et al. ............................ 428/654 |
| 5,077,094 | 12/1991 | McCall et al. ....................... 164/461 X |
| 5,226,953 | 7/1993 | Hodes et al. .............................. 75/693 |
| 5,301,741 | 4/1994 | Watson et al. .......................... 164/461 |

FOREIGN PATENT DOCUMENTS

| | | |
|---|---|---|
| 61-082992 | 4/1986 | Japan . |
| 61-135461 | 6/1986 | Japan . |
| 61-172655 | 8/1986 | Japan . |
| 63-072857 | 4/1988 | Japan . |
| 63-153249 | 6/1988 | Japan . |
| 63-153250 | 6/1988 | Japan . |
| 63-195239 | 8/1988 | Japan . |
| 63-195240 | 8/1988 | Japan . |
| 63-227753 | 9/1988 | Japan . |
| 63-286253 | 11/1988 | Japan . |
| 1-083396 | 3/1989 | Japan . |
| 1-252759 | 10/1989 | Japan . |
| 2-030394 | 1/1990 | Japan . |
| 2-050934 | 2/1990 | Japan . |
| 3-162543 | 7/1991 | Japan . |
| 3-281760 | 12/1991 | Japan . |
| 4-052052 | 2/1992 | Japan . |
| 4-319047 | 11/1992 | Japan . |
| 500040 | 2/1939 | United Kingdom . |
| 1289678 | 9/1972 | United Kingdom . |
| 2033794 | 5/1980 | United Kingdom . |

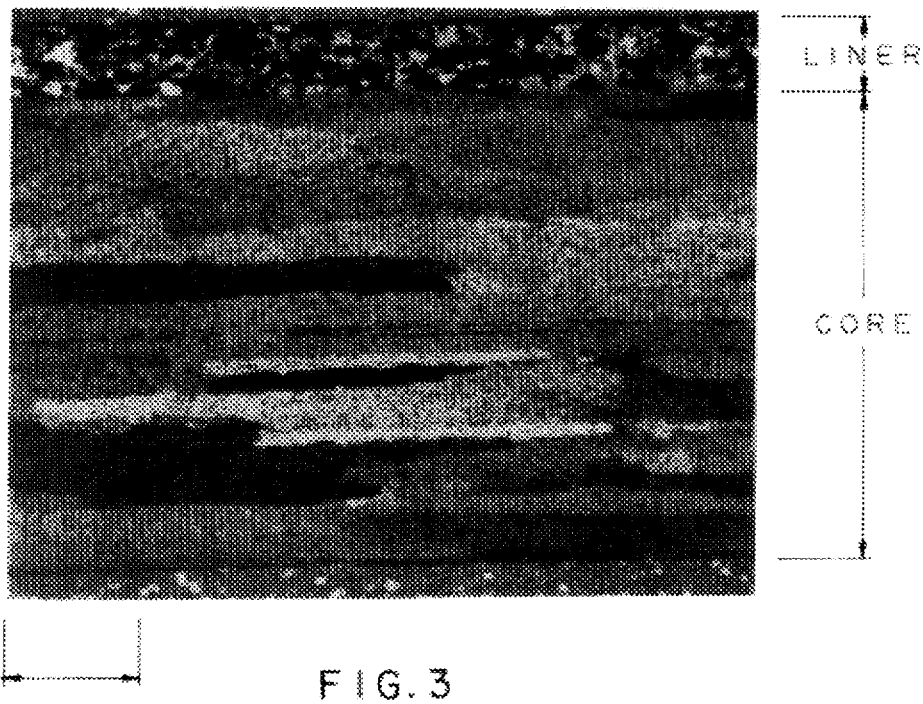
100 μm    FIG. 3
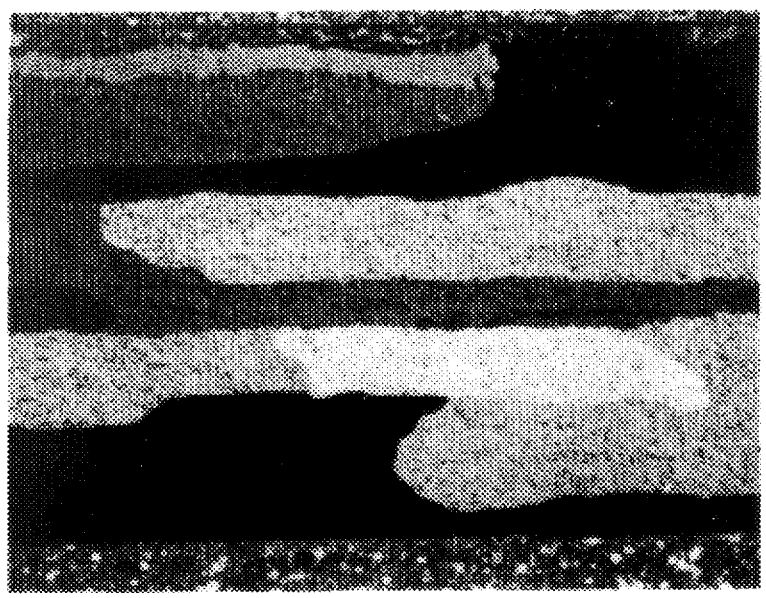
100 μm    FIG. 4

1 mm

100 μm

BACKSCATTERED
ELECTRON IMAGE

Zn X-RAY MAP

Si X-RAY MAP

Mn X-RAY MAP

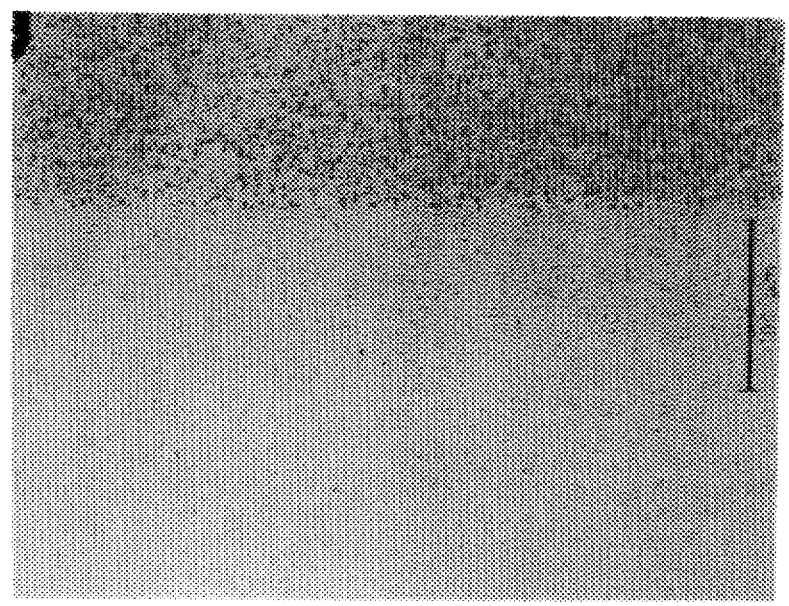
FIG.10
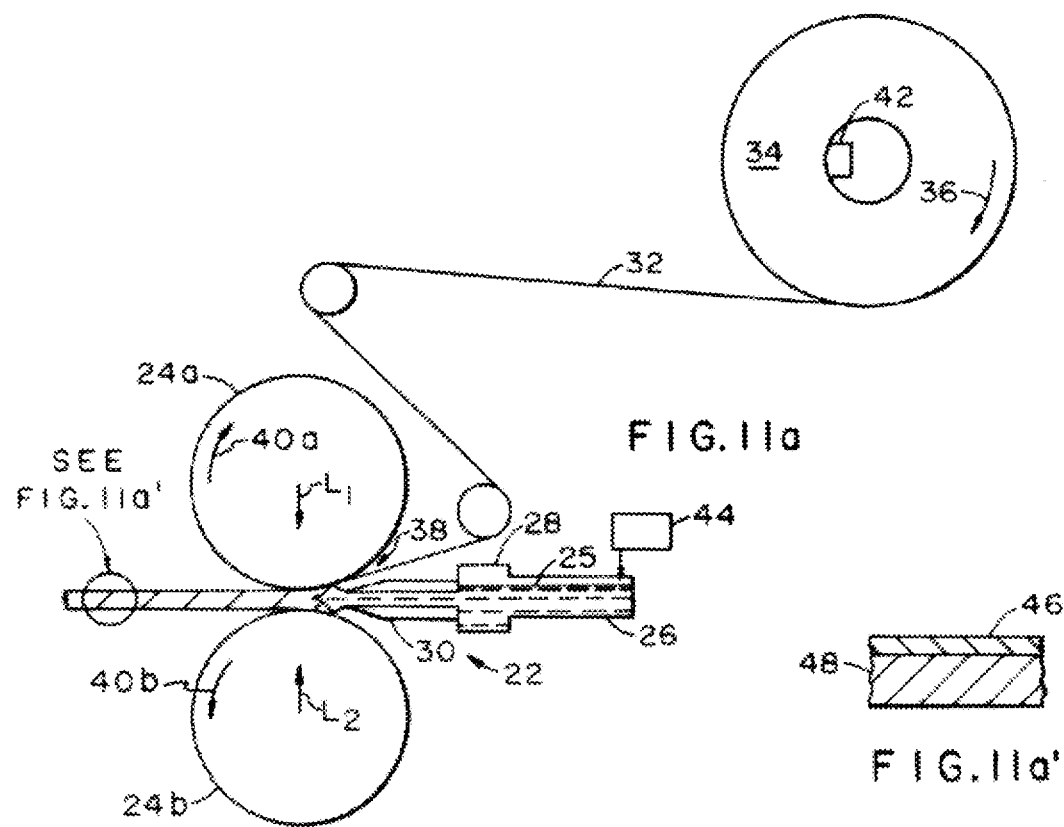
FIG.11a
FIG.11a'

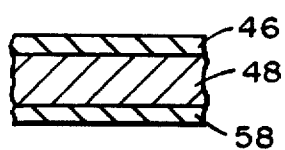
FIG.11b'
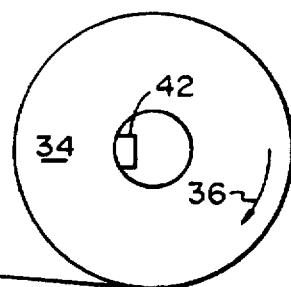
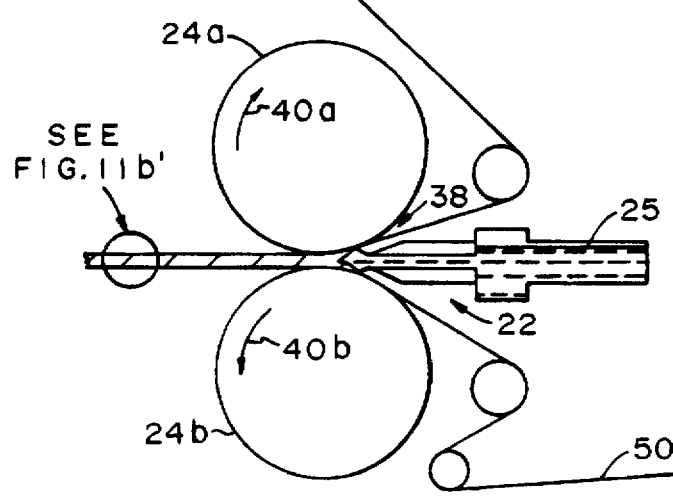
FIG.11b
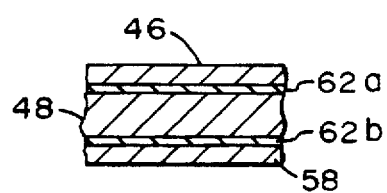
FIG.11c'
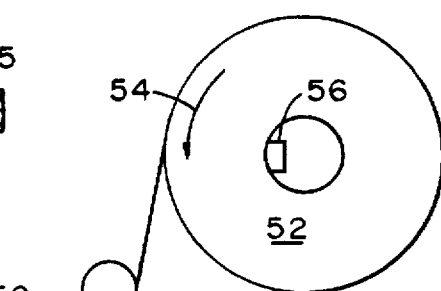
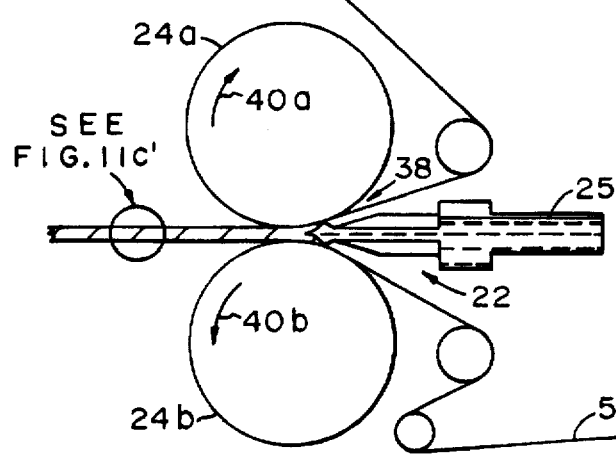
FIG.11c
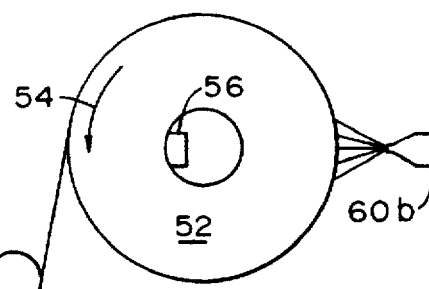

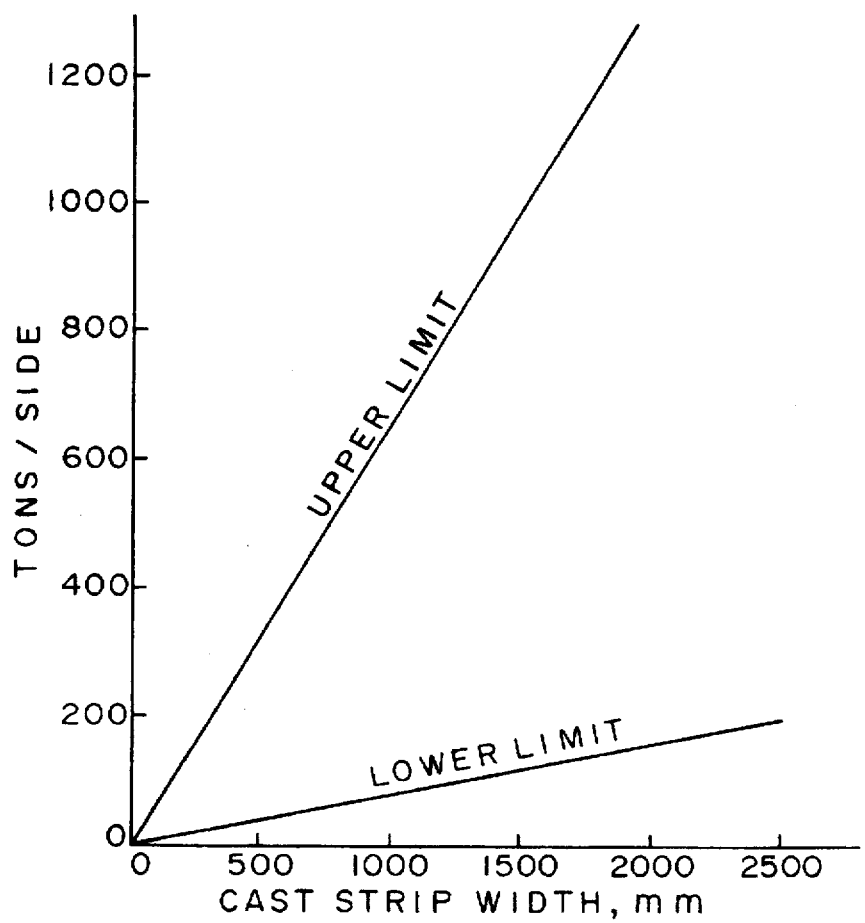
FIG.11d
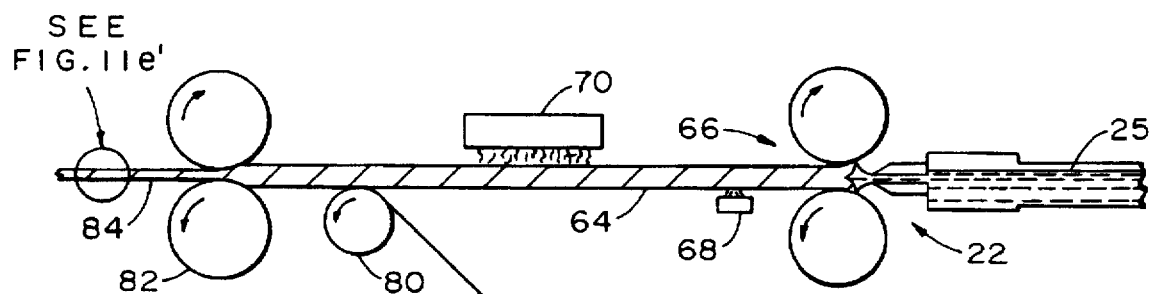
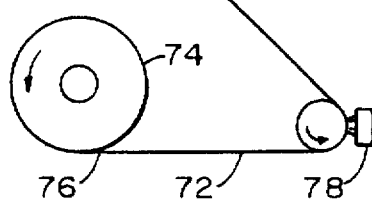
FIG.11e
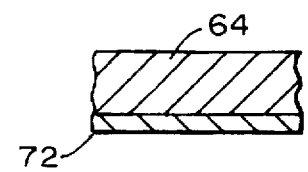
FIG.11e'

METHOD OF CONTINUOUSLY CASTING COMPOSITE STRIP

CROSS-REFERENCE TO RELATED APPLICATION

This application is a division of application Ser. No. 07/989,205, filed Dec. 10, 1992, now U.S. Pat. No. 5,476, 725, which is a continuation-in-part of application Ser. No. 07/670,576, filed Mar. 18, 1991, now U.S. Pat. No. 5,187, 046.

TECHNICAL FIELD

This invention relates to clad metallurgical products and to their manufacture and use. An example of the invention relates to the manufacture of clad aluminum alloy for brazing applications by a direct casting and rolling method from aluminum alloy braze, or filler, material and an aluminum alloy melt which solidifies to form the substrate, or core, which will later serve as a structural member in a brazed assembly.

INTRODUCTION AND WORK OF OTHERS

Clad aluminum alloy materials for brazing applications formed from aluminum alloy core material and aluminum alloy filler material as a surface skin is well known. This material is most commonly formed by superimposing an aluminum alloy plate which serves as a skin material over an aluminum alloy cast ingot which serves as the core material. The filler plate can be applied to one or both surfaces of the ingot; however, in the case of a two side clad composite, one side may consist of aluminum or aluminum alloy plate used for reasons other than as filler material for the brazing process (such as corrosion or erosion protection, strength, diffusion properties, etc.). This composite then undergoes hot rolling to bond these two layers together to thicknesses of 0.150 to more than 0.300 inches. The clad material is then subsequently cold rolled down to thicknesses of 0.006 to 0.120 inches to obtain brazing sheet. At times, annealing may be introduced to aid in rolling efficiency or to achieve desired final mechanical properties.

Aluminum brazing sheet is used in a variety of thicknesses, depending on the application. For instance, in the air conditioning field, its thickness may range from 0.060 to 0.080 inches (1.5-2 mm), when being used for support purposes; from 0.019 to 0.025 inches (0.5–0.65 mm), for evaporator plates; from 0.012 to 0.015 inches (0.3–0.4 mm), for so-called "tube stock", which is sheet material which is formed into tubes for carrying fluids, i.e. gases, vapors, and liquids; and 0.003 to 0.006 inches (0.075–0.15 mm), for so-called "fin stock", or sheet material from which, for instance, radiator fins are made.

Japanese patent application Kokai No. 56 (1981)-91,970 of Mitsubishi describes in an Example 2 a roll cast production of brazing sheet made of an aluminum alloy core of composition 0.44% iron, 0.21% silicon, 0.12% copper, 1.1% manganese, remainder aluminum, clad on both sides with liners of composition 0.12% iron, 9.2% silicon, 0.1% copper, 1.1% magnesium, remainder aluminum. It is stated that liner material of 1 mm thickness was fed to the roll caster and that the product composite had a cladding thickness of 1 mm on each side of the core.

DISCLOSURE OF INVENTION

Definitions

Alloy compositions herein are given on a percent by weight basis, unless stated otherwise. Aluminum Association alloy designations are indicated by the letters "AA" prefaced to four numerals, thus in the form "AAXXXX". Reference may be made for compositional details to "Registration Record of International Alloy Designations and Chemical Composition Limits for Wrought Aluminum and Wrought Aluminum Alloys", Revised: April 1991, The Aluminum Association, Washington, D.C.

The "H1" portion of e.g. "H13" means "strain-hardened to obtain the desired strength without supplementary thermal treatment", while the "3" indicates "the degree of strain-hardening" on a scale of 0 to 8, where 0 stands for fully annealed and "8 has been assigned to indicate tempers equivalent to that achieved by a cold reduction (temperature during reduction not to exceed 120° F.) of approximately 75 percent following a full anneal." ALUMINUM STANDARDS AND DATA 1990, page 10, the Aluminum Association, Washington, D.C.

The "H2" portion of e.g. "H23" means "strain-hardened more than the desired final amount and then reduced in strength to the desired level by partial annealing", while the "3" indicates "the degree of strain-hardening" on a scale of 0 to 8, where 0 stands for fully annealed and "8 has been assigned to indicate tempers equivalent to that achieved by a cold reduction (temperature during reduction not to exceed 120° F.) of approximately 75 percent following a full anneal." ALUMINUM STANDARDS AND DATA 1990, page 10, the Aluminum Association, Washington, D.C.

"ksi or KSI" means "kilopounds per square inch".

Mechanical properties such as strength and elongation are as defined in ASTM E 6–89, Standard Terminology Relating to Methods of Mechanical Testing, and as determined according to ASTM B 557-84, Standard Methods of Tension Testing Wrought and Cast Aluminum- and Magnesium-Alloy Products.

The term "run-down test" refers to a test in which pieces of brazing sheet are suspended vertically in a furnace which is at the brazing temperature. The brazing alloy Cladding melts and a portion flows on the core to the bottom of the piece. The percentage flow of metal can be calculated by measuring the weight of a segment of the "brazed" piece of known dimensions and comparing that to the weight of the same size segment before brazing. The difference in weight represents the amount of brazing alloy that flowed. The total brazing alloy available for flow is determined by metallographically measuring the thickness of the liner before the heating to brazing temperature and calculating the amount of brazing alloy for a piece having said known dimensions. The percentage which flowed is then 100 times "amount that flowed" divided by "total available".

The term "SWAAT test" refers to the test of ASTM G85-A3, an Acidified Synthetic Sea Water (Fog) Test. Samples were oriented to maximize condensate contact with the tubes.

The term "filler material" is used herein in recognition of the fact that it is common to make a distinction between "soldering" and "brazing", for instance, and it is intended that the term "filler" encompass the materials used in both of these processes and, in fact, any material which melts and later solidifies at a joint between members.

The term "solidus temperature" means the temperature at which some melting of a material first occurs. At the "liquidus temperature", which is greater than, or equal to, the solidus temperature, the material is completely molten. The "equal to" occurs in some cases, such as in the case of pure materials, eutectic compositions, etc.

In stating a numerical range for an element of a composition or a temperature or other process matter or a property or an extent of improvement or any other matter herein, and apart from and in addition to the customary rules for rounding off numbers, such is intended to specifically designate and disclose each number, including each fraction and/or decimal, between the stated minimum and maximum for said range. (For example, a range of 1 to 10 discloses 1.1, 1.2 . . . 1.9, 2, 2.1, 2.2 . . . and so on, up to 10. Similarly, a range of 500 to 1000 discloses 501, 502 . . . and so on, up to 1000, including every number and fraction or decimal therewithin.) "x max." means "x" and every number less than "x", for instance "5 max." discloses 0.01 . . . 0.1 . . . 1 and so on up to 5.

OBJECTS OF THE INVENTION

Brazing sheet finds wide applications in heat exchangers and other similar equipment, but there can be problems associated with its corrosion resistance. This may be the result of the filler material entering the grain boundaries of the core material during brazing, to render the core susceptible to intergranular corrosion. In addition, the brazing sheet can lose strength and be readily deformed as a result of this attack, and this is also a problem.

It is an object of this invention to provide a method for the direct manufacture of clad material, instead of having to start with thick cladding on thick ingot and hot rolling that combination down to the desired sheet material thickness. In the present invention, one may start, instead, with a filler material skin layer in sheet form and a melt of aluminum alloy for the core; alternatively, the core may be roll cast first and subsequently roll bonded with the filler. The clad material of the invention provides brazing sheet of superior corrosion resistance, brazing performance, and design flexibility, including improved control of relative layer thicknesses.

These, as well as other objects of the invention which will become apparent in the disclosure which follows, are achieved by products and processes as described below.

Products

I. Products of the invention include composite materials comprised of a core material and one or more claddings on the core material. These may include so-called braze sheet, which includes a structural core and a cladding on the core of a brazing alloy. Products of the invention include filler metal bonded to a core member to form assemblies having structural members exhibiting distinctive features of the braze sheet cores of the invention. Products of the invention have the following characteristics:

A. Microstructural characteristics

1. Core
a. Non heat treatable
   i. Segregation—In the case of aluminum alloys, all usual non-heat treatable, core alloy compositions, when roll cast, show some amount of segregation of eutectic-type elements (Fe,Si,Mn) in their microstructures. These generally concentrate at the midthickness of the sheet. This segregation is a good indicator that the material has been roll cast. In the case of core alloys of Al—Mn type alloy, for instance alloys based on AA3003, the segregation is evident as thin, isolated, discontinuous layers of material rich in $Al_{12}(Fe,Mn)_3Si$ particles. These layers are not dispersed by heat treatment and are only lightly broken-up by deformation. The length of the segregation regions can extend up to several hundred micrometers in the rolling direction. In one-side clad materials of the invention, the segregation is still essentially at midthickness, although displaced slightly towards the clad surface of the sheet.
   ii. Grain size—Product grain size will vary depending upon specifics of composition, the processing history, and the temper and gauge of the product. Regardless of absolute size, the grains of, for instance, Al—Mn type alloy are always pancake shaped. For one sample of tube stock of alloy type AA3003 and 0.012" thickness, the average core grain size prior to brazing was: 27 µm thick by 660 µm long, with width estimated at about 200 µm. Processing this to fin stock of 0.005" thickness would make the grains thinner and longer, for instance, about 11 µm thick and 1600 µm long. An important aspect of grain size is the one established during a brazing cycle, since the matrix will either recrystallize or undergo grain growth during brazing. The same sample of AA3003 type tube stock described above had an after braze average grain size of 100 µm thick, 470 µm length and 340 µm width. This presented a pancake shaped grain structure that had a very large average grain surface area exposed to the braze liquid that was about 2.5 times that of the closest competitor sample examined, or an exposed average grain surface area of about 0.06 $mm^2$. Preferably the exposed average grain surface area of core material of the invention is greater than 0.075, 0.1, or 0.125 $mm^2$.

Grain size measurements—Grain size measurements herein were made using variations of the "Intercept" Procedure or "Directional Grain Count" Method of ASTM Specification E112. Several random micrographs of the grain structure are taken at a suitable magnification such that the grains are clearly distinguishable. At too low a magnification the grains can be too small to discern, while at too high a magnification there will be only a few grains in the micrograph. These micrographs are taken in three different material cross-sections: one containing the longitudinal and short transverse orientations, one containing the short transverse and long transverse orientations and the third contains the longitudinal and long transverse directions. This third section is taken at the core side of the interface between the braze alloy and the core alloy. Thus, it exposes the core grain structure at that interface. It is obtained by carefully polishing through the residual braze layer. Test lines are then drawn on the micrographs in directions corresponding to the longitudinal, short transverse and long transverse directions. The number of grain intercepts (segments of test lines of given length which lie over images of grains) along the length of the test line segments are counted. Average grain dimensions in the different sample directions are determined by dividing the total length of the test lines in that direction (adjusted for magnification) by the total number of grain intercepts along that test line. When referring to average grain area (as for instance at the liner/core interface), such is calculated as the product of the average grain length and the average grain width. When grain size is too large to effectively capture on micrographs, which is often the case with roll cast AA3003 based core alloys, techniques similar to those described above are applied, but without using micrographs. That is, a sample is polished and etched to show the grain structure. Using a microscope with an eyepiece that has a reference marker superimposed on the image, the sample is traversed a measurable distance (measured by vernier readings or simply by the dimensions of the sample if the whole sample length is used) in a given direction. The grain intercepts along the effective line defined by the reference mark in the eyepiece are counted as the sample is traversed. This is repeated for several traverses in a given direction and then in the other directions if needed. The measurements are reduced to average grain dimensions or area by the same methodologies defined above.

iii. Secondary phase particles (sometimes termed "constituent particles" and sometimes termed "dispersoids") —These in AA3003-based roll cast core alloys of the invention are in addition to the grains of primary, or matrix, phase of aluminum-based solid solution and are dominated by two types of intermetallic compound phases: $Al_{12}(Fe,Mn)_3Si$ and $Al_6(Fe,Mn)$. Unlike those formed in ingot source AA3003 alloys (where they have a bimodal particle size distribution), the particles in roll cast AA3003 are best described by a unimodal, log-normal distribution with a log mean size ($\bar{x}$) determined by the composition and specific thermal history, but typically the $\bar{x}$ will be in the range of 0.5 to 0.7 μm.

b. Heat treatable—An example of a heat treatable aluminum alloy for a roll cast core of the present invention is AA6951.

i. Segregation—Segregation in AA6951 in the present invention differs from that in AA3003 type alloy in that the following phases can be present: $Al_{12}Fe_3Si$, $Mg_2Si$, $FeAl_3$, and some Q-phase ($Al_4CuMg_5Si_4$).

ii. Grain size—One sample of O-temper fin stock, AA6951, had the following approximate grain dimensions: 10 μm thick and 30 μm long prior to the braze cycle. After the braze cycle: 20 μm thick and 35 μm long.

The difference in grain shape in the case of this example of the invention versus the example based on AA3003 above is thought to be because of certain factors that influence grain shape in the two alloys. In roll cast alloys, such as here, the initial grain shape after casting is elongated in the rolling/casting direction. In the AA3XXX alloy system, processed as described, there is copious precipitation of Al—Mn dispersoids which, to a large extent, inhibit the usual mechanisms of recrystallization by grain boundary migration. Thus, during high temperature exposure, the AA3XXX material experiences essentially a grain growth reaction which retains the general morphology of the starting grain structure. Alloy AA6951 does not have the Al—Mn dispersoids, so it is free to recrystallize and assume a more equilibrium, equiaxed grain structure.

iii. Particles—Particles in AA6951 are approximately the same size as for AA3003, but they are of different type as noted and are present in a smaller volume fraction.

2. Cladding (also called "liner")

a. Brazing alloy liner (also called "filler")

i. Segregation—The nature of the particles and the heat treatments the cladding materials receive make segregation less of an issue. The samples investigated so far have had segregation in locations other than t/2, i.e. some are closer to the surface.

ii. Grain size—The grain size in the sheet material forming the liner stock is relatively fine, being stabilized by the constituent particles. In general the grains will have dimensions smaller than 20 μm. A liner of AA4XXX of nominal composition 9.8% Si, 1.5% Mg, balance Al, on one sample of brazing sheet of the invention had a grain thickness of 6 μm and a grain length of 20 μm. Thus, for instance, average grain length in brazing alloy liner of the invention is less than 20 μm.

iii. Secondary phase particles—The Si and intermetallic compound constituent particles in liners of the invention are generally more spherical, or equiaxed, in shape as compared to the situation in liners made by usual hot rolling of laminated billet. The spherical diameter is around 4 μm. This shape is a result of the roll casting process and heat treatment cycles which the material receives. For instance, the liners of other brazing sheet material found on the market have rod shaped particles with thickness of approx. 4 μm but lengths of, say, 10 μm. One advantage of this different microstructure is that there is less opportunity than there is in traditional ingot casting to grow large primary Si particles during the casting process. Such particles have been reported to be detrimental to forming (Ref: SAE Trans. 852228).

b. Anodic liner—A important aspect of anodic liners of the invention is that they retain their anodic characteristic even after the braze heat cycle.

i. Segregation—Anodic liners of the invention are basically segregation free.

ii. Grain size—After the braze cycle, the grain size of anodic liners of the invention will be fairly coarse, i.e., the grain thickness will be the full thickness of the liner and grain length will be greater than 40 μm.

iii. Particles—Anodic liners of the invention have very few particles in them.

c. Barrier liner—The structure of barrier liners of the invention depends on the method of their introduction into the total composite. In the case of arc-sprayed liners, these liners almost defy description by the usual descriptive features. It is perhaps better to discuss these liners from a macroscopic point of view, i.e. in terms of effectiveness of their composition and thickness for the purpose which they serve, which is to shield the core material from elements coming from the molten brazing alloy during brazing. See U.S. Pat. No. 2,821,014 of M. A. Miller, issued Jan. 28, 1958, for "Composite Aluminous Metal Article" for further information concerning barrier liners for use in the present invention.

B. Elemental composition

1. Core—The core material can be selected from the general family of material systems.

a. Non heat treatable—Most commonly, a non heat treatable core is of the manganese-containing aluminum alloy family (AA3XXX) in line with the design criteria needed to be achieved. In the particular situation in which a corrosion resistant property is desired, it is preferred to use an aluminum alloy containing 0.5–2.2% and preferably 1.1–1.8% manganese, 0.1–0.7% and preferably 0.1–0.3% iron, 0.05–0.6% and preferably 0.05–0.3% silicon and 0.05–0.5% and preferably 0.10–0.4% copper. It is also possible to incorporate titanium or zirconium into this composition, preferably between 0.01–0.2%, in order to enhance grain size and grain morphology, if desired. When adding titanium for grain refining during casting, it is desirable to also add boron at the rate of 20–40% of the titanium addition. If an increase in strength is desired, magnesium can be added in the range of 0.25–1.2% or chromium in the range of 0.05–0.25% to this melt. There is usually no need for the presence of elements other than those mentioned here.

An aluminum-base alloy of the invention, especially suited for serving as core material for braze sheet which is roll cast, contains no more than about 0.4% iron, no more than about 0.15% silicon, from about 0.1% to about 0.7% copper, and greater than about 1.5% manganese. Magnesium may also be added up to approximately 0.4% in some cases.

Preferably, the manganese content is in the range from about 1.5% to about 2.5%. Desirably, the manganese content is greater than about 1.6%. It will be noted that, essentially, the composition of this new alloy resembles that of AA3003, but, for instance, the manganese content is higher, and the copper content extends to higher values than in the case of AA3003. Preferably, this alloy is solidified in a process having a solidification rate at least as high as that found in roll casting, or in a process having a higher solidification rate, this in order to trap as much manganese and copper as possible in solid solution. This alloy of the invention is preferably used as a core material clad with an aluminum-silicon brazing alloy. Preferably, processing following casting, up to the point of production of the clad brazing sheet product, should minimize thermal exposure of the sheet, in order to keep as much manganese and copper as possible in solid solution. For instance, desirably, the sheet should be kept below 700° F. (as much as possible). Thus, a preferred processing of this material involves only cold rolling after casting, followed by a final partial anneal; e.g. the material is manufactured to an H24 temper. When subsequently brought to brazing temperature in a brazing operation, it is thought that this alloy of the invention develops an anodic surface layer on the side contacted by the molten brazing alloy and that this anodic surface layer helps the core to resist pitting corrosion perforation. To the extent that copper remains in solid solution following brazing, increased copper will make the core more cathodic relative to the anodic surface layer. Preferably, copper at the higher end of the copper composition range is used; i.e. copper is preferably in the range from greater than about 0.2% to about 0.7% copper, and even in the range from greater than about 0.6% to about 0.7% copper. Rapid cooling from brazing temperature can keep elements in solid solution and may be used, provided that a given assembly will not be harmed, for instance by warping or introduction of undesirable residual stresses.

b. Heat treatable—Required alloying elements for aluminum alloy AA6951 are 0.2–0.5% silicon, 0.15–0.4% copper, and 0.4–0.8% magnesium.

2. Cladding a. Brazing alloy—The brazing alloy can be selected from the AA4XXX family of aluminum alloys, i.e. the aluminum alloys comprised mainly of aluminum and silicon according to the application of the brazing sheet that is produced from the clad material. The usual practice is to use an aluminum-silicon alloy containing 5–13% silicon or with the addition of various elements such as magnesium to the same alloy family.

b. Anodic liner—Anodic liners may be any material which is anodic relative to the core, zinc or zinc-containing aluminum alloys being possible choices.

c. Diffusion Barrier liner—The barrier liners used in the invention are typically high purity aluminum. An Al—Mn alloy will, however, better limit the penetration of Si into a core of, say, AA6951 than will pure Al, so that an Al—Mn alloy is preferred.

C. Mechanical properties—Brazing sheet material made according to the invention, with roll cast cladding and roll cast core, is of higher tensile strength than that made by the prior art, hot rolled ingot process. For a given temper, tensile strength will be greater than 10% higher, or even greater than 15% higher.

D. Installation characteristics

1. Brazing behavior—The effect of brazing cycle on grain structure has already been described above. The large pancake shaped grains in the core alloys of the invention result in less silicon penetration into the core and better flow of the braze alloy, allowing for easier fillet formation. In a run-down test on brazing sheet of the invention, having AA3003 type sheet core and AA4104 braze metal, roughly 31% of the available braze metal flowed.

E. Service

1. Corrosion—Corrosion test results on AA3003-based core alloy of the invention indicate that the roll cast core materials of the invention have the potential for having excellent resistance to perforation by corrosion. In brazed tube/fin samples exposed for up to 21 days in the SWAAT test, examination of the tube indicated that the majority of the core material experienced little or no significant corrosion. There were, however, a few isolated spots where severe intergranular corrosion was observed resulting in tube perforation. The cause for the localized corrosion in those particular samples has not been determined. Nevertheless, the general corrosion behavior over the majority of the material indicates that once we eliminate the cause of the local corrosion sites, we should have a material with excellent resistance to perforation by corrosion.

Processes

II. Processes of the invention fall into several categories and are described as follows:

A. Laminating at roll caster rolls

1. General details—According to this process of the invention, clad aluminum alloy material, for example for brazing applications, is manufactured in a direct continuous casting method, roll casting, by feeding in a band shaped sheet of aluminum alloy filler material to at least one roll of a pair of rotating, cooled (for instance, water cooled) rolls. Into the continuous mold formed by the sheet and roll, or by the multiple sheets (if there is more than one sheet), there is simultaneously fed core material in the form of a molten aluminum or aluminum alloy, which is solidified by heat extraction to the rolls and through the band, or bands. The composite material, comprised of said band shaped skin material and solidified melt core material, is then extruded out of said continuous mold via the casting load exerted by the rolls. This introduces at least 2 percent hot working of the clad composite.

The band shaped sheet of aluminum filler material serves as the skin material for the clad product. As noted, it is fed in along just one of the rolls, of just one of the surfaces is clad, but separate sheets can be fed in along both rolls in the manufacture of a product requiring both surfaces clad while the aluminum alloy melt is solidified between both sheets. In some cases it is desired to have one side of a two side clad product to be clad with a material other than standard filler materials. For instance, other aluminum alloys, stainless steel, copper, etc., may be used, depending on product specifications or the design criteria needed to be achieved. Because of the increased process flexibility which this direct casting process has over conventional hot line methods of producing clad materials, it is even possible to obtain four and five layer clad composites. A four or five layer composite could be: liner on top and bottom with one or two sprayed interliners. A three layer composite could be either liner on top and bottom or one liner (top or bottom) with a sprayed interliner.

Feeding of the band, or bands, is done as follows. The band shaped sheet of aluminum alloy filler material is fed in along the roll at an arc of contact of greater than 5 degrees while simultaneously applying tension to the sheet via a friction braking system or any other suitable method of tension application. The band shaped sheet of aluminum filler material can range in thickness incoming to the roll bite from 0.006 to 0.070 inches.

2. Making the band-shaped filler sheet—The aluminum filler material is manufactured beforehand, preferably by a direct continuous casting method, such as roll casting, although other fabrication methods are feasible. The material subsequently receives cold rolling and thermal treatments to achieve desired mechanical properties prior to being used as the liner feed material for the roll-cast production of composite sheet. The aluminum skin sheet may undergo a cleaning treatment prior to the cladding procedure to rid the surface of foreign particulate or rolling residue which may be detrimental to the brazing performance.

3. Casting and hot working details—As explained generally above, the core is provided by a technique which resembles the roll casting method of manufacturing solid metal product from a molten metal supply. The thickness of the core formed from the melt is usually between 0.150–0.300 inches and preferably 0.190—0.275 inches. The casting rate (cast strip speed exiting rolls) is usually between 35–75 inches/min. The casting temperature will range between 1240°–1300° F. and will differ with particular aluminum alloy melt composition.

A remarkable feature of the invention as applied to the manufacture of brazing sheet is that the aluminum brazing alloy skin sheet, or liner, melts at lower temperatures than the core, and yet the brazing alloy does not melt when it contacts the molten core alloy in the region of the roll bite. The process is run with sufficient cooling of the rolls, for instance using an internally circulated coolant, such as water, that the brazing alloy is held below its solidus temperature. Table I presents solidus and liquidus temperatures for various materials of interest for brazing sheet manufacture according to the invention. Note that the solidus temperatures of the brazing alloys, and even their liquidus temperatures, are lower than the solidus temperatures of the core alloys.

TABLE I

Approximate Solidus & Liquidus Temperatures
for Some Alloys Relevant to Aluminum Braze Sheet

| Alloy | Solidus (°F.) | Liquidus (°F.) | Reference |
|---|---|---|---|
| Core alloys | | | |
| AA3003 | 1190 | 1210 | 1 |
| AA3005 | 1180 | 1215 | 1 |
| AA6951 | 1140 | 1210 | 2 |
| Braze liners | | | |
| AA4104 | 1038 | 1105 | 2 |
| AA4045 | 1070 | 1095 | 2 |
| AA4047 | 1070 | 1080 | 2 |
| Interliners | | | |
| AA1100 | 1190 | 1215 | 2 |
| Zn | 786 | 786 | |

References
1 = Metals Handbook, 9th Ed. Vol. 2, American Society for Metals, Metals Park, Ohio
2 = Metals Handbook, 9th Ed. Vol. 6, American Society for Metals, Metals Park, Ohio Pressure applied to an unwind brake system holds the skin sheet under tension ranging, for example, from a tensile stress in the sheet in the range of about 30 to about 700 psi (force ranging from about 40 to about 800 pounds for a sheet 46-inches wide by 0.025-inches thick), and longitudinal deformation of the skin sheet ranges from greater than 5% to preferably 10–60%. Higher longitudinal deformations, for instance 120% and higher, may be used. Tension in the skin sheet also has the effect of causing the skin sheet to bear tightly against the roll of the roll caster throughout the arc of contact of the skin sheet on the roll, thus assisting heat transfer to the cooled roll caster roll and protecting the skin sheet, especially in the case of braze alloy skin sheet, from reaching higher temperatures, such as might melt a braze alloy.

The load carried by the caster ranges, in the case of 50-inch wide cast strip, from 100–900 tons/side and 450–750 is desirable; this is a measure of the force being exerted by the casting rolls in the hot deformation of the newly cast laminate of core and skin sheet.

Both longitudinal deformation of the skin sheet (also termed liner extension) and hot working of the cast composite contribute to bonding of the skin sheet to the core. As for hot working, such can only occur once the core has solidified; otherwise, there is only a zero-load pushing of two solidified surface layers into a liquid, or mushy, center. Percent hot working may be calculated on the basis of the composite thickness when core solidification has been completed, $t_0$, versus composite thickness at roll exit, $t_2$, by the formula: $100(t_0-t_2)/t_0$. However, this is, in general, difficult to do in practice, since it depends on knowing when the core has completely solidified, an event which occurs inside the composite, at or near the centerline of the core. Consequently, the invention provides for sensing the percent hot working on the basis of the caster load, as measured for instance by load cells at the roll axle bearings. Preferably, percent hot reduction is >20% and, more preferably 30–60%; these equate, in the case of cast width of 50-inches, to caster loads of <200 tons and between 400–1500 tons, respectively. Caster load, or percent hot working, may be varied primarily by changing either casting rate or the location where the molten metal is emitted from the ceramic caster tip into the region between the rolls of the roll caster. Increasing casting rate decreases $t_0$ and thus decreases percent hot working, which is sensed by a decrease in caster load. Decreasing casting rate does the opposite. Increasing the setback, or distance, of the ceramic caster tip from the point of closest approach of the rolls in the roll bite increases $t_0$ and thus increases percent hot working, which is sensed by a increase in caster load. Decreasing the setback does the opposite. A bonding of the skin sheet to the core is one indication that hot working did occur in the process. Another indication in the case of manganese-containing aluminum core alloys is the presence of centerline segregation.

The technology disclosed in U.S. Pat. No. 4,678,023 of Knapp and Waltz, issued Jul. 7, 1987, for "Closed Loop Delivery Gauge Control in Roll Casting" may be utilized to control caster load. For instance, Knapp and Waltz use the electric current being drawn by the motor driving the rolls of a roll caster as a measure of caster load, and show a proportional-integral control to hold the electric current, and thus the caster load, constant. Knapp and Waltz also show how to compensate for roll eccentricity. They as well show a control based directly on caster load.

With respect to liner extension, also termed longitudinal deformation, such may be a combination of liner stretching before the roll bite plus liner elongation resulting from the thinning occurring in the hot working. Since it may be difficult to distinguish between the two components, the longitudinal deformation values given herein are total values and are determined in practice by marking a gage length $l_1$ on the incoming liner sheet and then observing the increased length $l_2$ of that gage length upon exit from the caster nip (roll bite). Liner longitudinal deformation in percent is then $100(l_2-l_1)/l_1$.

To determine the percent cladding on the composite, the following formula is used:

$$\text{Percent Clad} = 100(l_1 \times t_1)/(l_2 \times t_2)$$

Where:

$l_1$, $l_2$, and $t_2$ are as defined above, $t_1$=Thickness of incoming liner stock, and $t_2$=Composite thickness at roll exit. Liner extension can be varied, for instance, by varying the tension in the liner stock as it is being fed to the roll bite. The percent cladding is retained in any subsequent cold rolling, except that sheet angularion in the cold rolling process may be used to change percent cladding, if desired.

Melt composition, including the addition of grain refiners such as titanium and boron, and cleanliness, may be accomplished by usual technology such as molten metal filtering of the type used in metal casting. In novel processes which are especially helpful for manufacturing the clad products of the invention, low melting metal (e.g. Zn) additions can be fed directly into the metal stream during roll-casting of either the core or the liner of the brazing sheet. Higher melting metal additions such as Mg, Mn, Si, etc. may be made preferably by arc spraying appropriate master alloys, for instance an aluminum-based manganese-containing master alloy, directly into the metal stream at the highest practicable voltage (to obtain the smallest metal particle size and the lowest practicable atomization pressure to reduce molten metal turbulence to a minimum). Air may be used as a carrier gas but the use of gases such as argon or nitrogen may be necessary to reduce oxidation of the metal stream and/or the sprayed metal.

4. Subsequent processing—The clad material is then cold rolled to the prescribed temper to obtain the brazing sheet. An annealing treatment can be performed at any stage of the rolling process to obtain the desired physical and mechanical properties. This treatment is usually conducted between 200°–850° F. depending on the desired properties. Preferably, increased corrosion resistance is obtained by omitting homogenization after casting; in certain cases, however, a homogenization treatment may be used, for instance to improve formability.

B. Exit side laminating—In this process variant of the invention, at least the core is roll cast, and the core and liner are subsequently rolled together to form a bonded composite.

1. Making the core—Roll casting of the core is as explained above with respect to laminating at roll caster rolls, except that a liner is no longer fed-in along either of the rolls.
2. Making the liner—Preferably, the liner is made as explained above with respect to laminating at roll caster rolls.
3. Bonding—Core and liner are rolled with combinations of temperature, surface preparation, and reduction in thickness effective to achieve bonding of the core and liner.

C. Applying layers, such as anodic and barrier layers—When the laminating is done at the roll caster rolls, it is preferred that no more than two liners be fed-in, one at each of the rolls. In such case, one of the liners may be a brazing alloy and the other a core alloy, with the intermediate layer being an anodic or barrier material which is fed in the molten state into the roll bite. However, when the two liners are both, for instance, brazing alloy, and the molten alloy is the core material, and even, optionally, when just a single brazing alloy liner is being placed on a roll cast core, interlayers may be supplied by means of plating, coating, or surface treatment of the liners. Extra layers may be applied, in the case of exit side laminating, by rolling for bonding, or they may as well be supplied by plating, coating, or surface treatment of other sheet materials to be rolled together for bonding. According to one variant of the invention, the brazing alloy itself is coated onto a core material. While it is preferred to use this technique of applying layers especially in conjunction with roll casting, it is as well applicable to any cladding process or to any of the continuous strip casting systems. For example, it is applicable to the process in U.S. Pat. No. 4,213,558 issued Jul. 22, 1980, to Hirobe et al. for "Continuous Casting and Cladding Process and Apparatus for Producing Metal Clad", using an endless mold system, with opposed continuous revolving mold surfaces, such as a pair of rolls, a pair of belts, or the combination of a wheel and a belt or caterpillar type tracks.

Background information on plating, coating, and surface treatment may be found in the following two resources and in the references cited in their bibliographies:

1. Metals Handbook, 9th Edition, Vol. 5, "Surface Cleaning, Finishing, and Coating", American Society for Metals (ASM), Metals Park, Ohio (1982); and
2. ASM Handbook, Vol. 18, "Friction, Lubrication, and Wear Technology", ASM International, Metals Park, Ohio (1992).

Among the various options of plating, coating, and surface treatment, the thermal spray coating process is preferred. Both of the above-cited references contain sections on the thermal spray coating process, and reference is made to them for additional details on that process. As explained in the Metals Handbook resource, the thermal spray coating process is any coating process in which material is heated to a molten or plastic state and propelled onto a substrate to form a coating; the process includes flame and plasma spraying using wire or powder materials sources. Arc spraying is a preferred type of thermal spraying process for application in the present invention.

D. Brazing to form filler metal bonded, or brazed, assemblies—The invention includes, as an optional additional step, the step of forming filler metal bonded assemblies.

BRIEF DESCRIPTION OF DRAWINGS

FIG. 3 is a photomicrograph of the same composite, showing grain structure before brazing (anodized+polarized light).

FIG. 4 is a photomicrograph of the same composite, showing grain structure after brazing (anodized+polarized light).

FIGS. 6a to 6c are a series of photomicrographs of longitudinal cross-sections of brazing sheet showing particle distribution (0.5% HF etch), FIG. 6a being an example of the present invention, while FIGS. 6b and 6c are of material made by the prior art process of hot rolling from ingot.

FIGS. 9a to 9d are a series of maps of longitudinal cross-sections of braze sheet of the invention showing element concentrations; the scale is the same on all of FIGS. 9a to 9b and is shown on FIG. 9a.

FIG. 10 is a photomicrograph of another composite of the invention, in transverse cross-section, showing particle distribution (0.5% HF etch).

FIGS. 11a to 11c are schematic illustrations of three laminating process variants of the invention.

FIGS. 11a' to 11c' are details of parts of FIGS. 11a to 11c, respectively.

FIG. 11d is a chart of operating load per side versus strip width for a twin roll caster, from lower limit to upper limit.

FIGS. 11e to 11h are schematic illustrations of four additional process variants of the invention.

FIGS. 11e' to 11h' are details of parts of FIGS. 11e to 11h, respectively.

MODES FOR CARRYING OUT THE INVENTION

Figure 1:
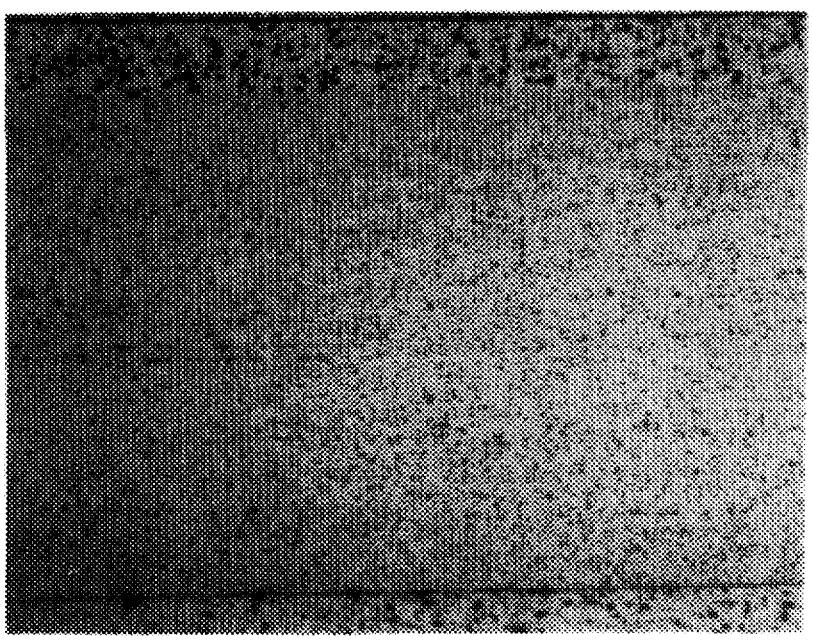
FIG. 1 is a photomicrograph of a tube-stock composite of the invention, in longitudinal cross-section, showing particle distribution (0.5% HF etch).
Figure 2:
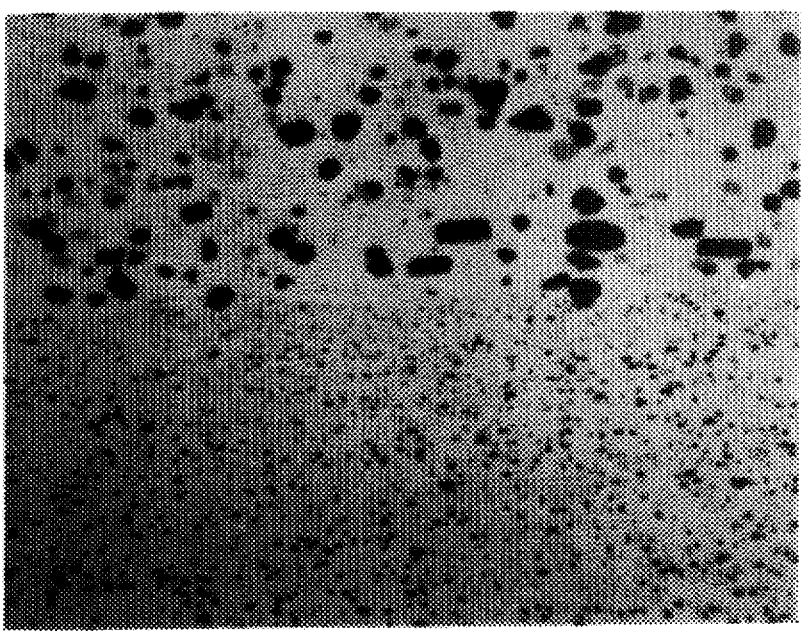
FIG. 2 is a photomicrograph of the same composite as in FIG. 1, in longitudinal cross-section, at greater magnification than in FIG. 1, showing particle structure near the liner/core interface (0.5% HF etch).

With reference to the figures in more detail, FIG. 1 is a micrograph showing particle distribution in a longitudinal cross-section of one side clad tube stock made according to a process of the invention (laminating at roll caster rolls) and illustrative of products of the invention. The cladding alloy is AA4104 and the core alloy is an AA3003-based alloy; the alloy is in the H14 temper. The particle distribution in the core is clearly missing the coarse constituent particles that would be present if it were fabricated from ingot source metal as in the prior art. Rather, all the particles are small, generally being smaller than 1.5 micrometers. Centerline segregation is evident near the centerline of the core. The particles in the liner (Si, Pi, and Mg2Si) are coarser than those in the core because of the processing of the liner prior to cladding. FIG. 2 shows a higher magnification micrograph of the liner/core interface. The interface is well defined, but clean and free of oxide or debris. Microprobe analyses of these type interfaces confirm that there is no melting of the liner stock into the core alloy during casting.

FIG. 3 shows the grain structure of this same material in longitudinal cross-section. The thin, "pancake" structure of the core grains is evident with grain lengths of several hundreds of micrometers being common. The grain structure of the liner, being on the order of tens of micrometers, is also evident.

Figure 5:
FIG. 5 is a photomicrograph of the surface of the core of the same composite after brazing, viewed in a direction perpendicular to the rolling plane.

FIG. 4 shows the longitudinal grain structure of this material after a braze type heating cycle. The grains in the core have grown in size. Resolidification of the braze alloy onto the core alloy has occurred epitaxially. FIG. 5 illustrates the very large rolling plane surface area of the grains in the core of the braze sheet just below the braze alloy, after braze. This view was obtained by lightly sanding the solidified braze alloy from the exterior surface of the tube stock, subsequent to having brought the braze sheet to brazing temperature.

Figure 6A:
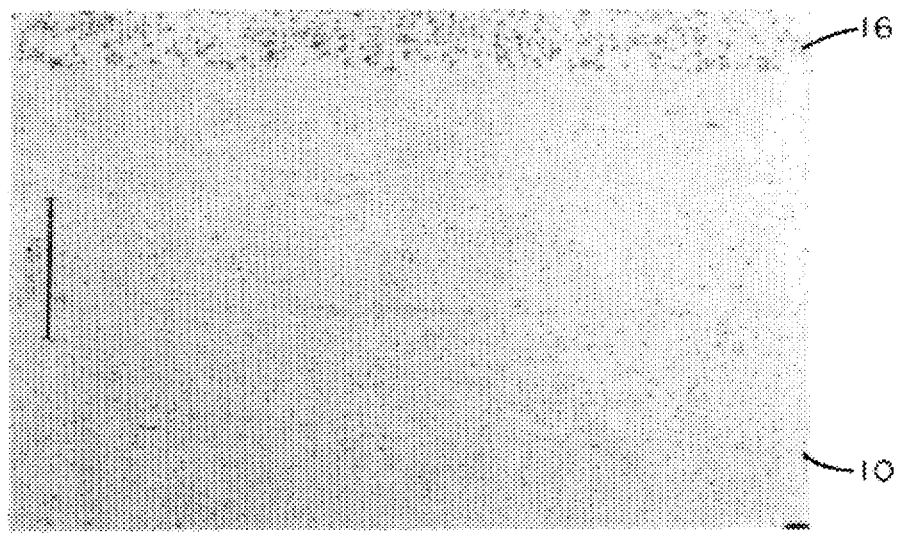
Figure 6B:
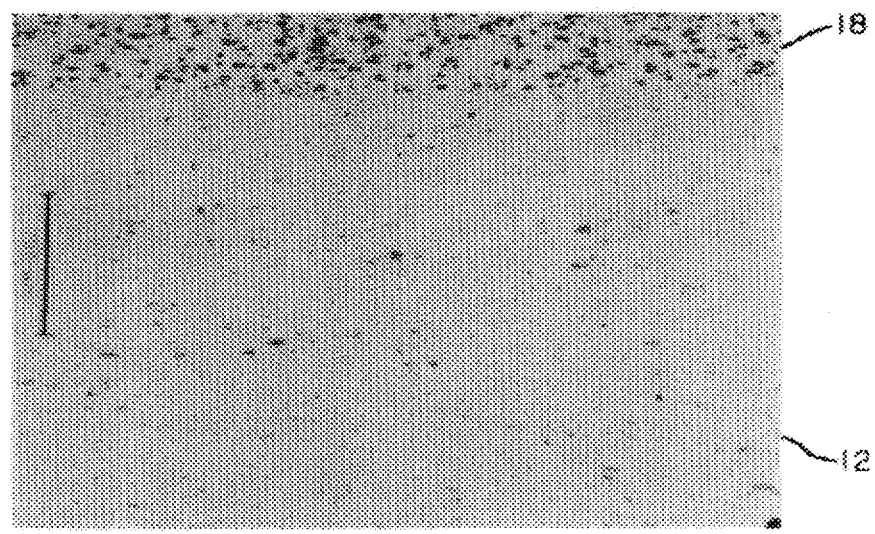
Figure 6C:
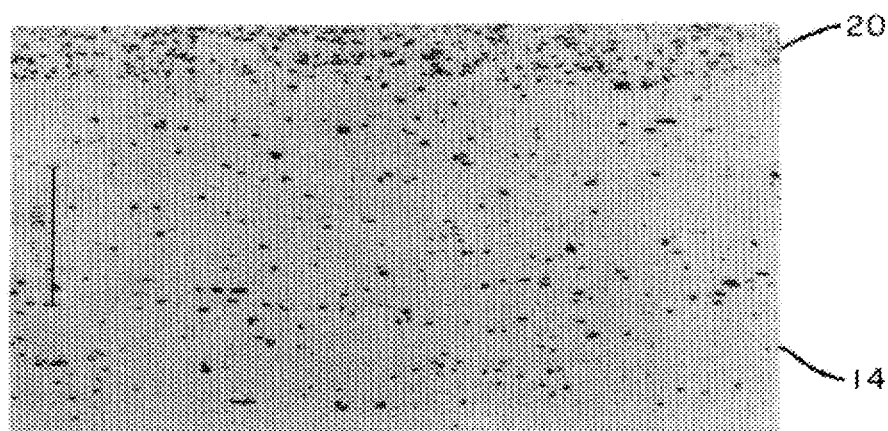

FIGS. 6a–6c provide a comparison of the distribution of particles in brazing sheet of the invention, made according to a process of the invention (roll cast liner, with laminating at the roll caster rolls during roll casting of the core), FIG. 6a, with prior art brazing sheet based on the hot rolling of ingot, FIGS. 6b and 6c. In each case, the core material 10, 12, and 14 is an AA3003-based alloy, while the brazing alloy cladding 16, 18, and 20 is AA4104. The particles in the brazing alloy cladding 16 of the invention are predominantly equiaxed, as compared to the prior art claddings. The particles in the core 10 of the invention are in a unimodal distribution, while those in the prior art cores are bimodally distributed.

Figure 8:
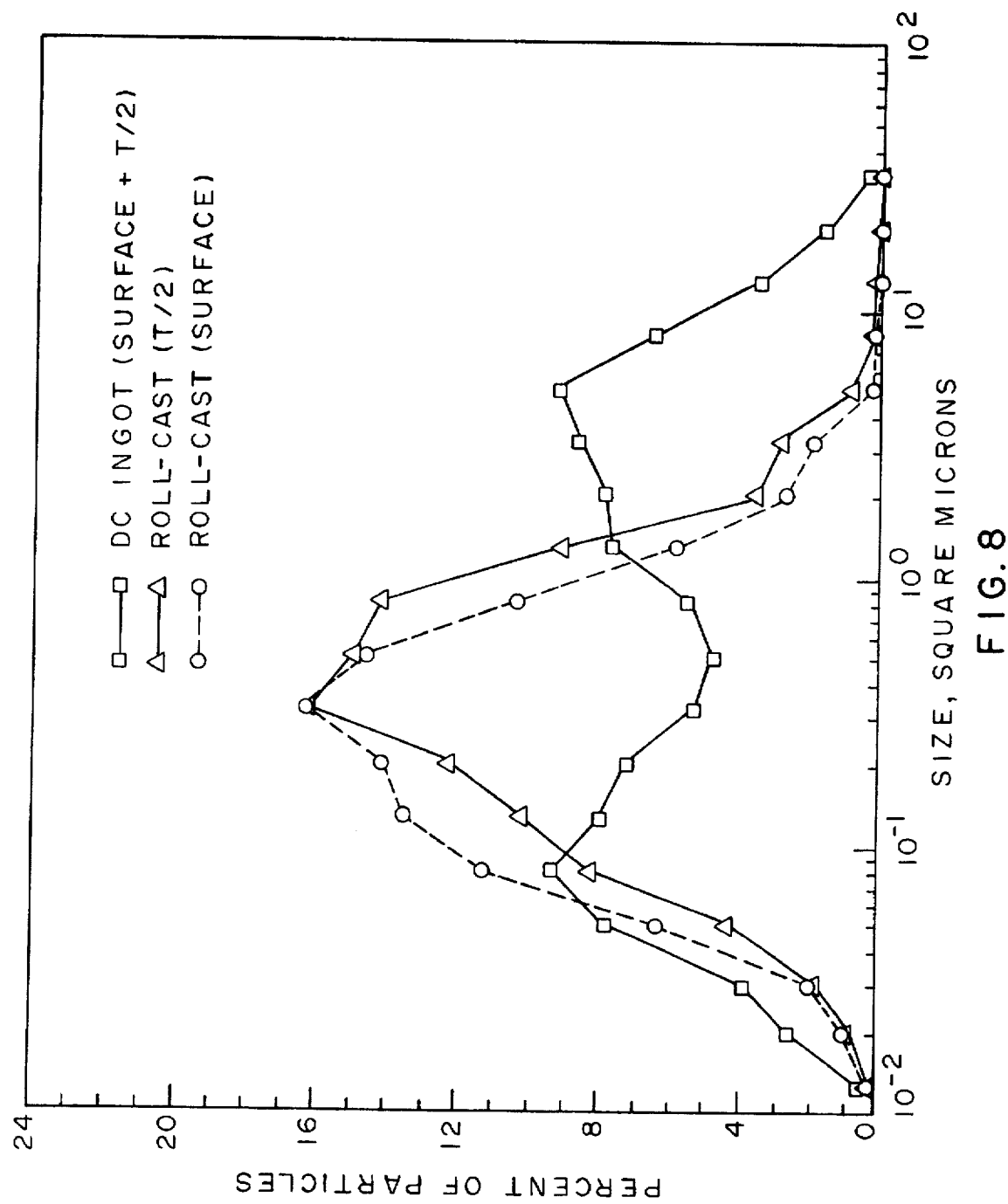
FIG. 8 is a plot of percent of particles having a given log mean area for examples of AA3003.
Figure 9A:
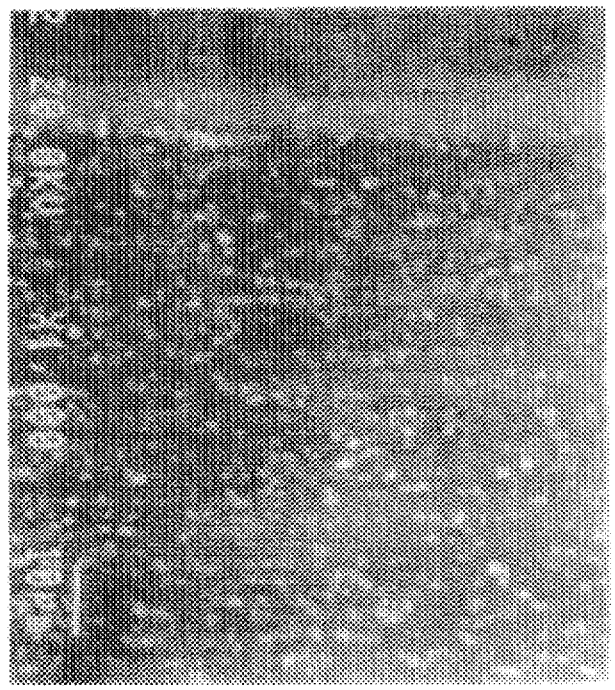
Figure 9B:
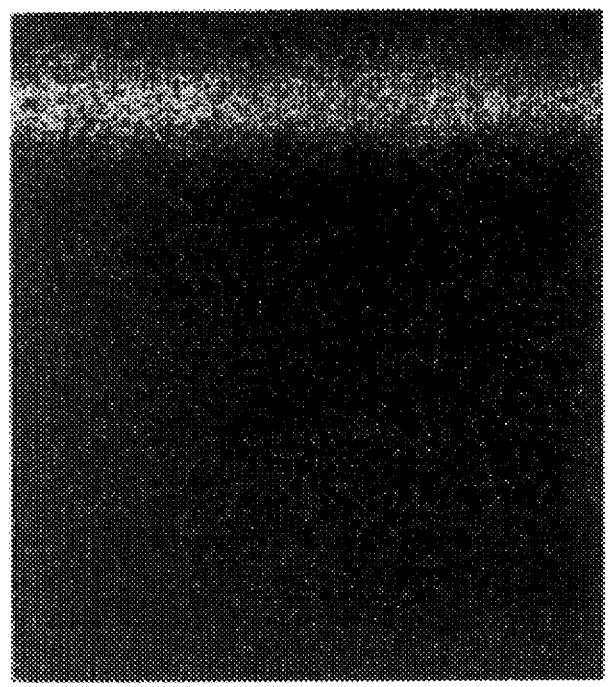
Figure 9C:
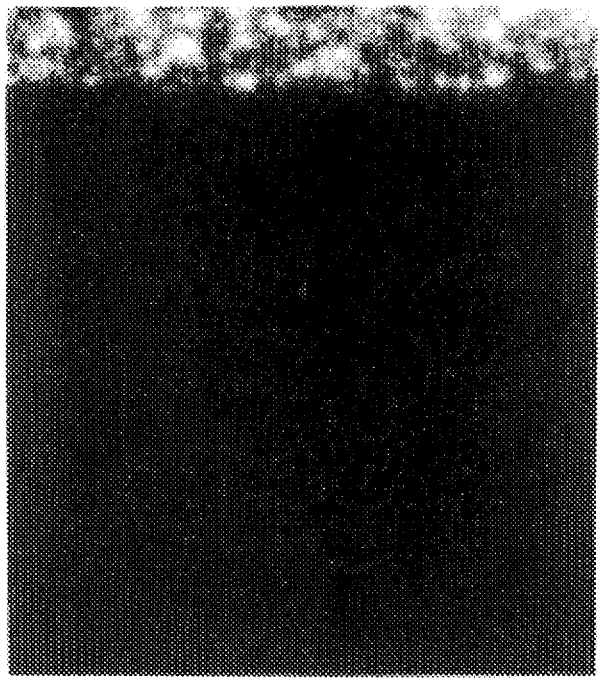
Figure 9D:
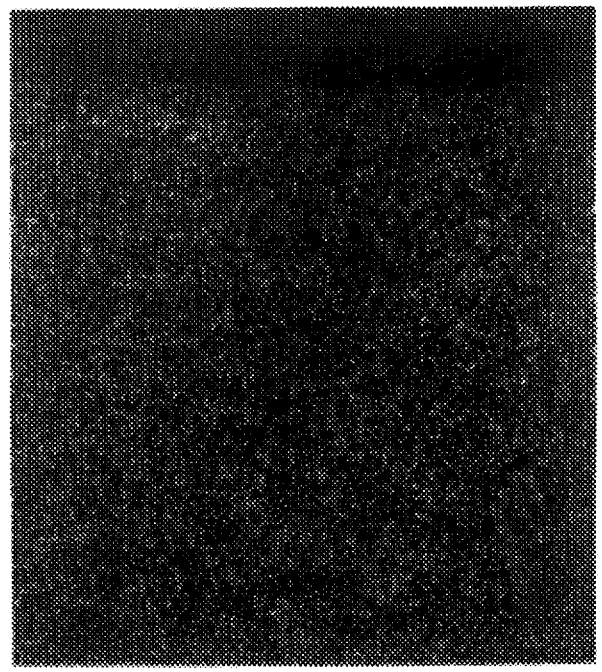

FIG. 8 further illustrates the different distributions of the intermetallic compound particles in AA3003 in the case of roll cast cores of the invention versus the DC (direct-chill) ingot derived cores of the prior art. In the roll cast case, there is a unimodal log normal particle size distribution of the intermetallic compound particles, with a mean log area of less than two micrometer$^2$, preferably less than one micrometer$^2$. In contrast, there is a distinct bimodal, or two-peaked, distribution in the case of the DC ingot material. The different distributions are, in fact, evident from inspection of FIGS. 6b and 6c, compared with FIG. 6a. The data of FIG. 8 was measured using a LeMont Image Analysis System interfaced with a Scanning Electron Microscope (SEM). Other image analysis systems interfaced with an SEM are available to generate equivalent data. An IBAS system interfaced with an SEM is one other example.

Information on these types of distributions and the presentation thereof, including the concepts "log normal distribution" and "mean log (X)", where X is the parameter of interest, for example area, can be obtained from the book "Probability Charts for Decision Making", by James R. King, Industrial Press Inc. 1971.

Figure 7:
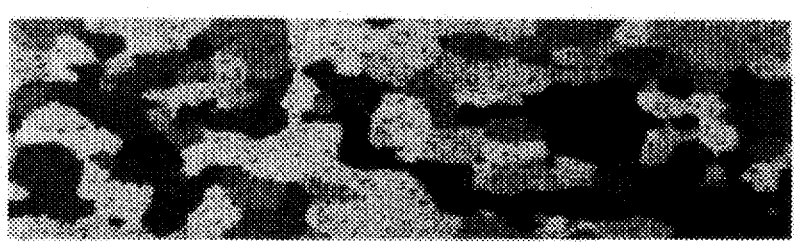
FIG. 7 is a photomicrograph of a roll-cast AA6951 core showing grain structure after a simulated brazing cycle (anodized+polarized light); the 100 μm scale of this FIG. 7 applies to this FIG. 7, as well as to FIGS. 6a–6c.

FIG. 7 shows the grain structure of a roll-cast, formerly H19-temper, AA6951 core of the invention, after a simulated brazing cycle.

FIGS. 9a to 9d show a backscattered electron image and X-ray maps of a braze sheet finstock of the invention in which a pure Zn interlayer was arc-sprayed onto an AA4045 braze alloy liner before cladding at roll caster rolls to an AA3003-based core alloy. The relative locations of the braze liner and core can be seen by the Si and Mn X-ray maps respectively. The Zn X-ray map shows the location of the Zn after all thermal and mechanical processing of the sheet to final gauge. The backscattered electron image is bright at areas having a locally higher atomic number than the aluminum matrix; thus, most of the bright particle areas contain iron and manganese and these predominate in the core, rather than in the silicon-containing brazing alloy cladding. FIGS. 9a–9d contain background noise; they are thus qualitative in nature and show areas of higher concentration by relative intensities.

FIG. 10 is a photomicrographic illustration of a brazing sheet product of the invention produced by the exit side laminating variant of the invention. Both the AA3003 core and the AA4045 cladding were first individually roll cast and then subsequently rolled together to produce bonding between them.

Referring now to the process schematic drawings, FIG. 11a shows a roll caster 22, including internally cooled steel rolls 24a and 24b, and a delivery system for delivering molten aluminum alloy 25. The delivery system is comprised of a trough 26, a tundish, or head, box 28, and a caster feed, or nozzle, tip 30. According to the invention, a band 32 of liner material is fed into the roll caster by unwinding from a coil 34 by rotation in direction 36. The band 32 is drawn into the roll bite 38 by the rotation of rolls 24a and 24b in the directions 40a and 40b. Brake 42 permits control of the tension in band 32. Hot working of solidified alloy 25 and band 32 occurs in the roll bite 38, as indicated by the opposing axle bearing loads $L_1$ and $L_2$. Alloying constituents may be added directly into channel 26 from feeder 44. FIG. 11a' is a detail of FIG. 11a and shows the roll cast composite product, including liner alloy 46 originating from band 32 and core alloy 48 originating from alloy 25.

The machinery in FIG. 11b differs from that in FIG. 11a in the provision of means for feeding another band of liner material, band 50, into the other side of the roll caster by unwinding from a coil 52 by rotation in direction 54. The band 50 is drawn into the roll bite 38 also by the rotation of rolls 24a and 24b in the directions 40a and 40b. Brake 56 permits control of the tension in band 50. FIG. 11b' is a detail of FIG. 11b and shows the roll cast composite product, including liner alloy 58 originating from band 50.

The machinery in FIG. 11c differs from that in FIG. 11b in the provision of means for providing thermally sprayed interlayers in the composite. Thermal spray deposition stations 60a and 60b spray a coating of, for instance, zinc onto bands 32 and 50. The coatings on the bands occur as interlayers 62a and 62b in the roll cast composite product, as shown in the detail in FIG. 11c'.

FIG. 11d shows a range of preferred values for $L_1$ and $L_2$ in the process schematics of FIGS. 11a to 11c.

FIG. 11e shows an embodiment of the exit side laminating process variant of the invention. A band 64 of solid aluminum alloy, in the form of the solidification product of molten aluminum alloy 25, is shown emerging from the exit side 66 of roll caster 22. Band 64 is given a surface preparation treatment, if required. In this case, the band is shown receiving a surface preparation treatment by an MIA (magnetically impelled arc) cleaning head 68, about which more will be said below with respect to FIGS. 11i and 11j. Additionally, band 64 is pre-heated by a suitable heat source 70. Concurrently with the movement of band 64 out of roll caster 22, a band 72 of aluminum liner alloy is being fed from coil 74 at liner unwind station 76. Band 72 is likewise given a surface preparation treatment, if required. In this case, the band is shown receiving a surface preparation treatment by an MIA (magnetically impelled arc) cleaning head 78, which is constructed in the manner of head 68, which construction will be described below with respect to FIGS. 11i and 11j. In some cases, operation of only one of the heads 68 and 78 may be sufficient. Band 72 is preheated at heated roll 80, and then bonded to band 64 in rolling mill 82 to form a clad sheet product 84, composed, as indicated in FIG. 11e', of an aluminum core alloy, band 64, and an aluminum liner alloy, band 72. An example of a clad sheet product 84 is brazing sheet composed of an AA3003 core and an AA4045 liner, such as used in the Examples section below.

Figure 11F:
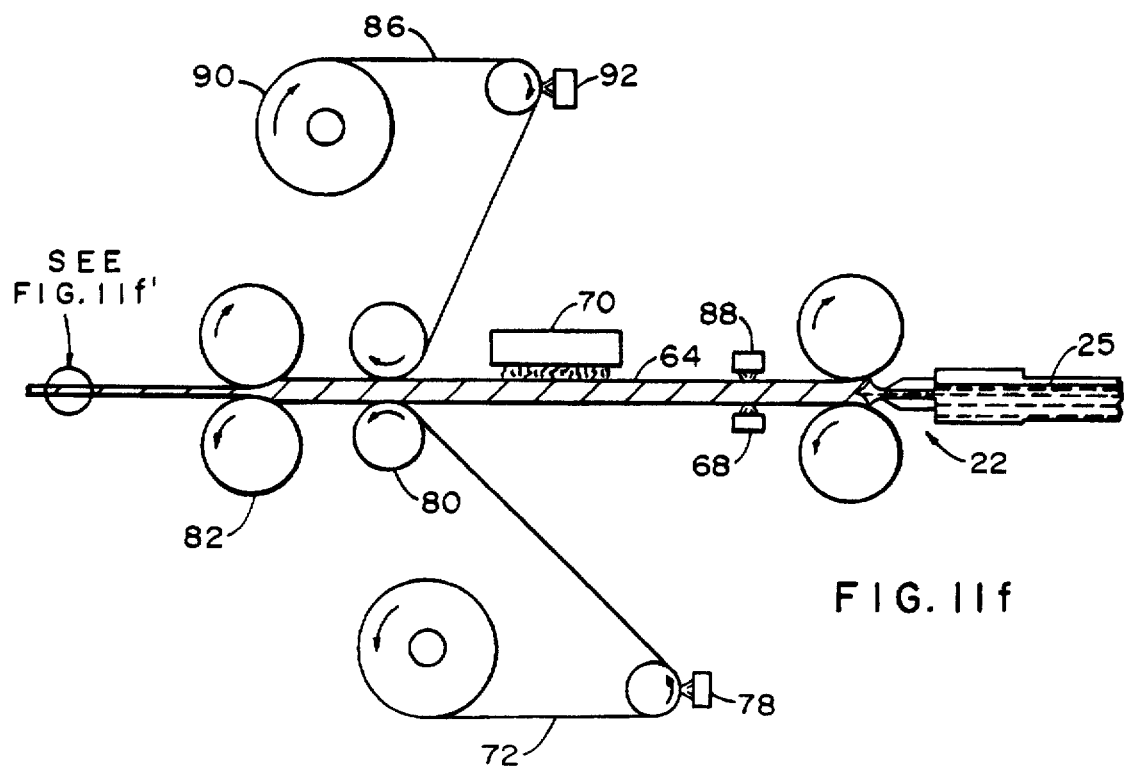
Figure 11F:
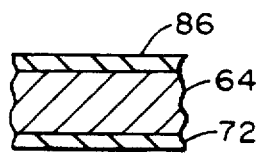

The machinery in FIG. 11f differs from that in FIG. 11e in the provision of means for feeding another band of liner material, band 86, into the other side of the rolling mill 82. Surface preparation is provided on both sides of band 64 by the provision an additional MIA cleaning head 88. Band 86 is fed from a coil 90 and cleaned by MIA cleaning head 92. The clad sheet product is composed, as indicated in FIG. 11f', of a core alloy, band 64, and two liner alloys, bands 72 and 86.

Figure 11G:
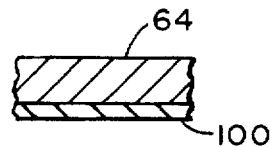
Figure 11G:
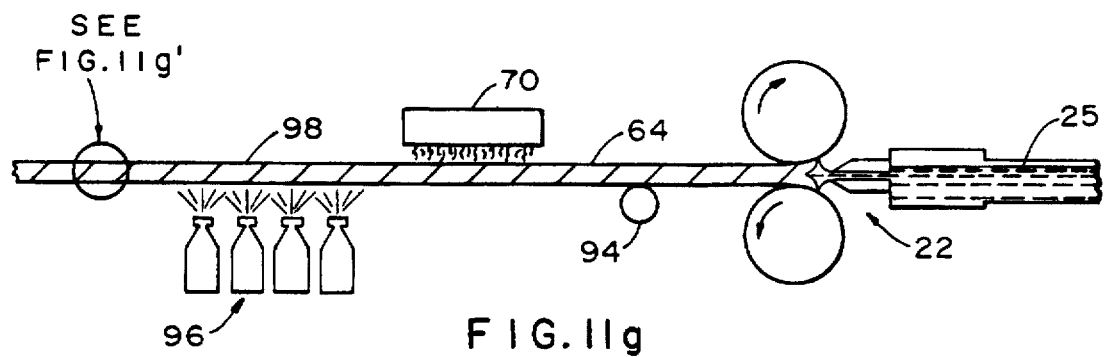

FIG. 11g shows an embodiment of applying braze cladding to a core by a thermal spray process, for instance arc spray. A band 64 emerges from the roll caster 22 and is given a surface preparation treatment, in this case by scratch brush 94. The band is then pre-heated at 70 and, from there, moves over thermal spray deposition heads 96, where an aluminum-silicon brazing alloy is applied, to form composite product 98, composed, as indicated in FIG. 11g', of a core alloy, band 64, and an aluminum liner alloy 100, in the form of an aluminum-silicon brazing alloy. A brazing sheet which could be made by the process of this FIG. 11g would be composed, for instance, of an AA3003 core and an AA4047 liner, such as used in the Examples section below.

Figure 11H:
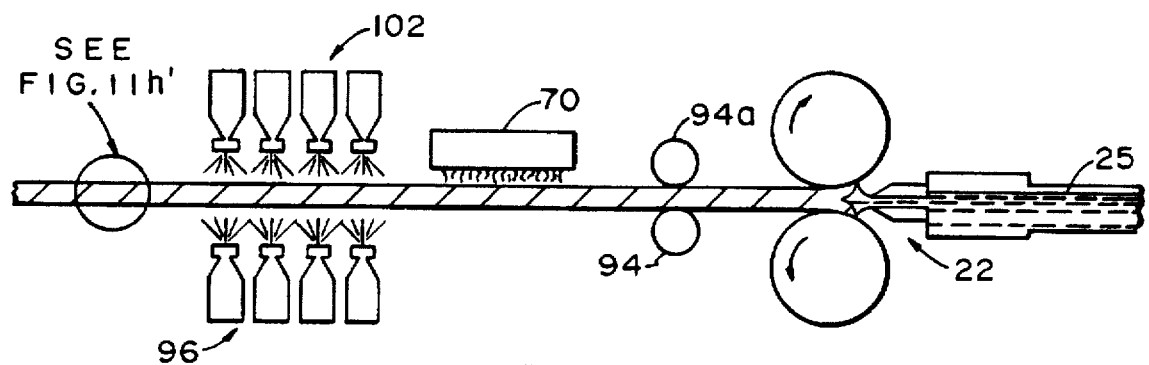
Figure 11H:
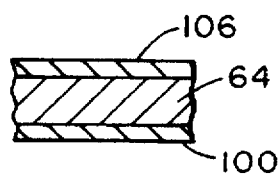

The machinery in FIG. 11h differs from that in FIG. 11g in the provision of a second set of thermal spray deposition heads, heads 102, for spray of a second liner, to form a two-side clad product 104, composed, as indicated in FIG. 11h', of a core alloy, band 64, and two liner alloys, layers 100 and 106.

Figure 11I:
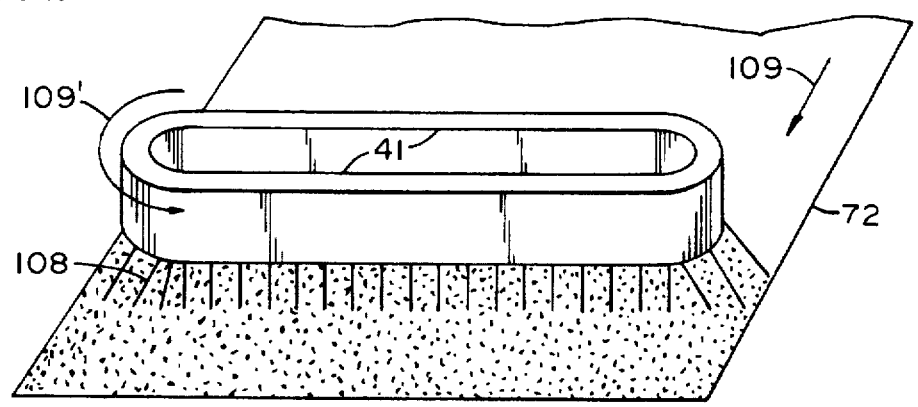
FIG. 11i is a perspective view of a portion of an illustrative one of the MIA arc cleaning heads of FIGS. 11e and 11f shown over a portion of the transverse area of a band of aluminum alloy that is to receive a surface preparation treatment by the cleaning head.
Figure 11J:
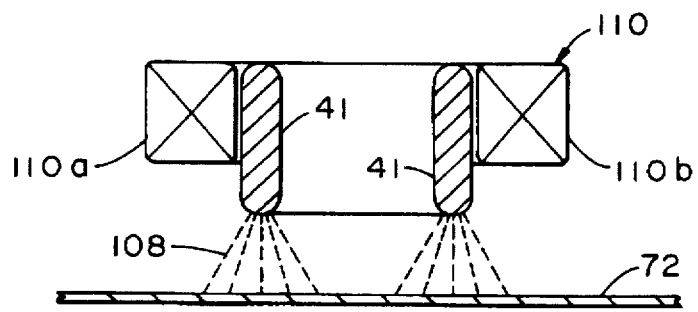
FIG. 11j is a side elevational, cross sectional view of the head portion of FIG. 11i, plus an arc rotating coil of the head, shown arranged above the band of FIG. 11i.

FIGS. 11i and 11j illustrate an example of an MIA arc cleaning head for use in FIGS. 11e and 11f. This equipment is disclosed more fully in copending U.S. patent application Ser. No. 07/670,576, now U.S. Pat. No. 5,187,046, entitled "Arc-Grained Lithoplate and Two-Step Method for Making It". Content of copending U.S. Ser. No. 07/670,576 and its corresponding European Patent Application Publication No. 0 504 811 A1, published Sep. 23, 1992, are included herein by reference.

FIG. 11i is a perspective view of a portion of an MIA arc cleaning head, said portion being an oval electrode 41, which is shown positioned over a band of metal to be cleaned, for instance bend 72 of FIG. 11e. The band is moving relative to the electrode, in the direction of arrow 109. The oval electrode is preferably at least as wide as the sheet to be surface treated. Most preferably, the oval electrode is wider than the sheet such that arcing from the two arches of the oval lie outside the range of the sheet. A conventional DC reverse polarity welding arc is drawn (with some superimposed high frequency current if needed for initiation and stability) between the oval electrode 41 and the face of sheet 72. The arc moves, or rotates, around the oval path formed between the electrode and the surface of the sheet, as represented by arrow 109'. The arc rotation arises for reasons to be explained in the description of FIG. 11j below; the rotation is so rapid that one sees a curtain of arc as illustrated by the lines 108. The interaction of the arc with the surface of the sheet cleans the sheet, as represented by the stippled area.

FIG. 11j is a side elevational view of electrode 41 showing the arc rotating coil 110 also included as part of the head. Coil 110, when energized by a DC current, provides a constant magnetic field to cause the arc to move, or rotate, rapidly around the oval path described by the electrode. The suitably mounted coil 110 appears in FIG. 11j as two DC coil cross sections 110a and 110b. The coil effects arc rotation in a manner which is well known in the field of magnetically impelled arc (MIA) welding, first taught in U.S. Pat. No.

2,280,800; suitably configured permanent magnets of adequate strength may also be used.

In operation, pneumatic cylinders, electropneumatic controls and the like (all not shown) will be used to position the oval, or elliptical, electrode in plasma-generating relationship to the surface of the sheet. An ionizable gas (not shown), which is unreactive with either the electrode or the aluminum sheet, is flowed around the oval electrode in a manner to ensure that it displaces atmospheric gases. To conserve gas, an enclosure may be built over the head.

The DC current used is in the range of from 0.005 to about 0.1 kwh/ft$^2$ with the exact amount used being determined by the chosen linear velocity of the sheet moving beneath the electrode, the amount of contaminants (lubricants and oxides) on the surface of the sheet and the desired texture of the prepared surface. The current is supplied from a commercial DC welding power supply which has a stable current output, preferably without high current/voltage spikes, in order to prevent melted spots or non-uniform surface areas. The open circuit voltage may be varied in the range from about 10 V to 60 V.

Figure 12A:
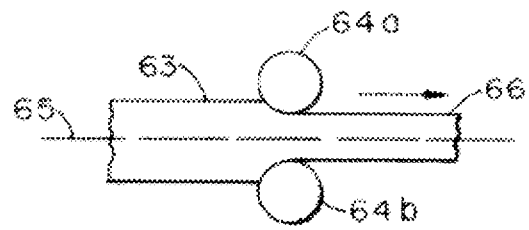
FIGS. 12a and 12b are schematic illustrations of two cold rolling process variants of the invention.

FIG. 12a illustrates the cold rolling of product of the invention. For instance, the product as illustrated in any of FIGS. 11a', 11b', and 11c' may be cold rolled in the process of achieving a desired product temper, such as the H24 temper. In the process illustrated in FIG. 12a, thicker product 63 enters rolls 64a and 64b along pass line 65, or horizontally, and leaves as thinner product 66.

Figure 12B:
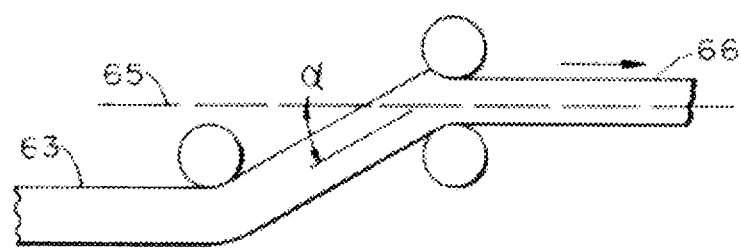

FIG. 12b shows the cold rolling of product using sheet angulation. The "angulation" is the angle at which the sheet to be rolled enters the roll bite, in this case the angle α. In the case of rolling the product of FIG. 11b', the top half of the sheet thickness is reduced more than the bottom half. Thus, the top liner now becomes thinner than the bottom, which changes the cladding ratio. If the product of FIG. 11a' were fed, this would be a method of reducing the percentage thickness of the cladding in the composite, in case the percentage thickness was above specification.

Figure 13A:
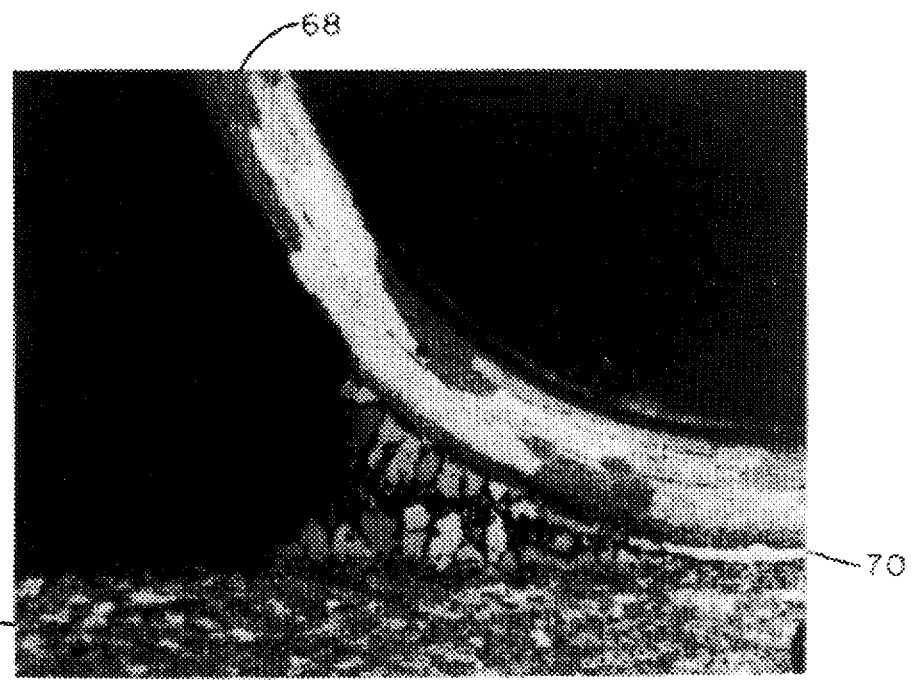
FIGS. 13a and 13b are photomicrographic views at different magnifications (using electroetch and polarized light) of a brazed joint made with braze sheet of the invention
Figure 13B:
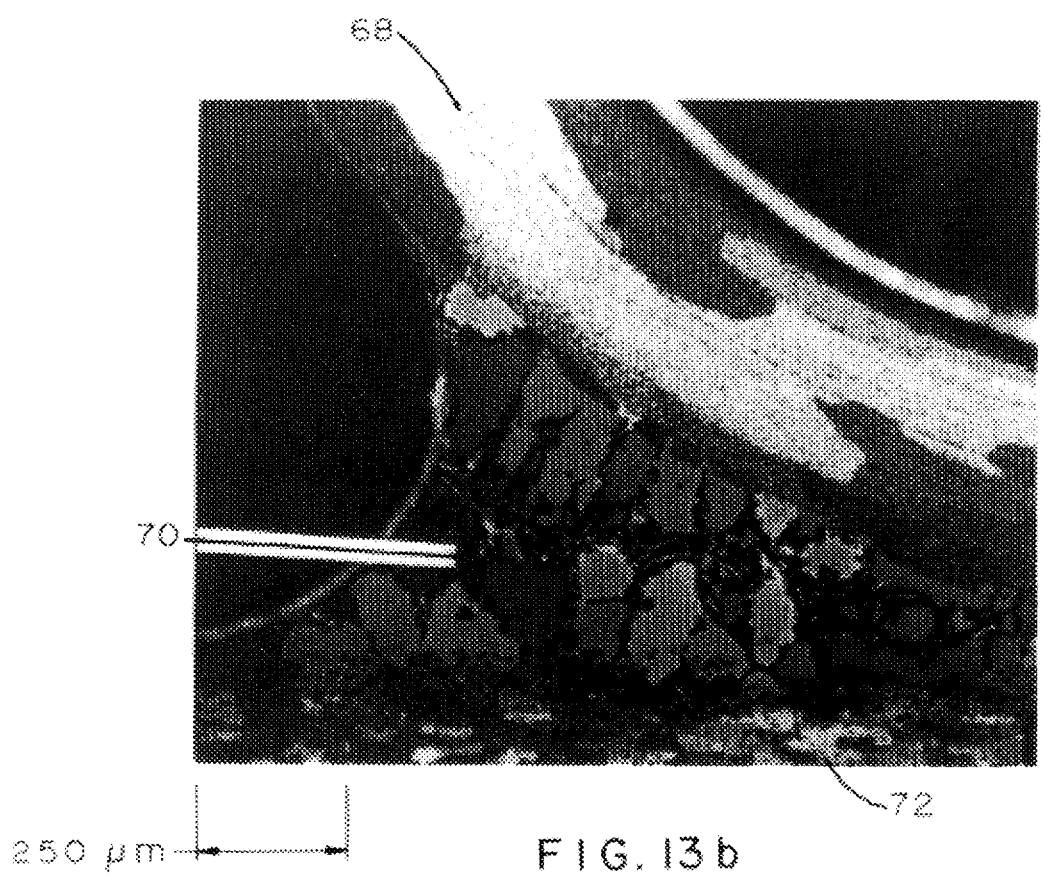

FIGS. 13a and 13b show a brazed assembly of the invention, made using a brazing sheet manufactured by laminating at roll caster rolls. One sees an AA3003 fin 68, which was the core material of the brazing sheet, joined by AA4104 brazing alloy 70 to an ingot-source AA3003 substrate 72. The brazing alloy melted from the core material during the vacuum brazing operation and flowed into the joint between fin 68 and substrate 72 to form the interface and the fillet between the fin 68 and the substrate 72. The substrate 72 may, for instance, be a tube in a radiator or evaporator, so that fin 68 acts as a heat exchanger on the tube.

EXAMPLES

Further illustrative of the invention are the following examples:

Example of Laminating at Roll Caster Rolls

A casting form comprised of a pair of water cooled rolls measuring 911 mm in diameter was used to manufacture material clad on one surface. The aluminum filler material was 0.016" thick sheet in coil form of essentially 0.3% iron, 10% silicon, and the remainder aluminum, i.e. AA4045. This material was fed along either the top or bottom roll while back tension was being applied in the form of brake pressure at 45 psi to the material. An arc of contact of 80 degrees was maintained between the filler material and the casting roll. The filler material underwent a controlled extension of 30% prior to the load created in the caster roll bite, which provides the necessary hot deformation of the clad material, to control the percent cladding applied.

The melt for the core contained 0.25% silicon, 0.62% iron, 0.15% copper, and 1.15% manganese, remainder aluminum (i.e., AA3003) and was cast at 54 ipm at a casting temperature of 1270° F. to form a composite clad material of 0.246 inches thick (filler sheet thickness of 0.012 inches, resulting in a 5% clad material).

This clad material was cold rolled to a thickness of 0.060 inches thick and then annealed at 800° F. for 2 hours to achieve an O-temper brazing sheet with 5% filler material on one side.

The material had the following O-temper mechanical properties: tensile strength (ultimate) 21.8 ksi, yield strength (offset=0.2%) 12.1 ksi, and elongation 24.0%. In contrast, in brazing sheet of the same thickness, compositional, and temper specifications, but made by the prior art hot rolled ingot process, tensile strength has not been known to exceed 19.0 ksi. Thus, material made according to the present invention enjoys a significant strength advantage over prior art brazing sheet.

A brazing sheet material likewise made by laminating at roll caster rolls, of 0.3-mm total thickness, including 10% cladding thicknesses on both sides of the core, core material an aluminum alloy containing 0.7–0.9% silicon, 1.0–1.3% manganese, 0.05–0.15% chromium, 0.1–0.2% titanium, cladding on one side an aluminum alloy containing 2.0–2.4% magnesium, 1.8–2.2% zinc, cladding on the other side AA4045, (U.S. Pat. No. 5,011,547 being of possible relevance), had the following H34-temper mechanical properties: tensile strength (ultimate) 29.8 ksi, yield strength (offset=0.2%) 25 ksi, and elongation 12.5%. In contrast, in brazing sheet of the same thickness, compositional, and temper specifications, but made by the prior art hot rolled ingot process, tensile strength has not been known to exceed 25 ksi.

Examples of Exit Side Laminating

Initial trials were done on sandwiches of roll cast AA3003–AA4045 alloy which were preheated to 1050° F. max. and reduced up to 40%. The mating surfaces of the sandwiches were vapor degreased and scratch brushed prior to reduction. The liners physically stuck to the core after 20, 30, and 40% reductions. Two sandwiches were run at each reduction. A sample from each reduction was further cold rolled to 0.080" after it was allowed to cool to room temperature. Brazing alloy melt off tests of the hot reduced and cold rolled specimens showed that the cladding was well bonded to the core down to a 20% reduction. The liner alloy melt off test consists of placing the specimen to be tested in a furnace at about a 30 degree angle from vertical and heating to approximately 1120° F. The liner will melt and run to the bottom of the specimen. If the melted brazing alloy completely wets the core alloy surface, then the liner is probably metallurgically bonded to the core. If the liner does not completely wet the core alloy, but leaves skips or blisters, then the liner is not well bonded to the core alloy. Metallographic examination of the specimens showed no bond line between the core and the liner on any of the cold rolled specimens nor the 30% and 40% reduced specimens. The 20% reduction specimen showed some evidence of a bond line.

The above rolling trials and tests were repeated for sandwiches of as-received (uncleaned) AA3003–AA4045 alloy sheets. The results of the liner melt off tests and metallographic examination were very similar to those described above.

The rolling trials described above were repeated on as received (uncleaned) AA3003 core and AA4045 liner alloy sheet sandwiches at a preheat temperature of 450° F. The liner would not stick to the core alloy with less than a 40% reduction. Even at a 40% reduction bonding was marginal. This specimen was then cold rolled to 0.080". Liner melt off testing showed numerous scattered small blisters on the surface of the core material which would indicate incomplete bonding of the liner to the core.

Examples of Zinc Sprayed as Corrosion Protection

Several AA4045 sheet specimens were arc sprayed with pure zinc using a TAFA arc spray system consisting of a Model 30 *8B35 350 Amp arc spray power unit and a Model 8830 arc spray gun manufactured by Hobart TAFA Technologies of Concord, N.H. The following thicknesses, 0.001", 0.002" and 0.003", were sprayed onto 0.020" thick 4045 sheet specimens at the following arc spray parameters: 150 amps, 27–28 volts, 30 PSI atomizing air and 3"–4" gun-to-work stand-off distance. Prior to arc spraying, the sheet samples were wire brushed with a coarse wire wheel both in the direction of rolling and at 90° thereto. The 0.020" sheet samples were vapor degreased after brushing; the 0.235" sheet sample was not.

Examples of Applying Diffusion Barriers Onto Heat Treatable Core Brazing Sheet

Sheet samples of 0.020"-thick AA4045 were arc sprayed, using the TAFA arc spray equipment described above, with 0.002" thicknesses of AA1100 and AA1260 aluminum alloys. Spray parameters were: 160 amps, 28–29 volts, 30–32 psi atomizing air pressure and 3"–4" gun-to-work stand-off distance. Prior to spraying, the sheet samples were wire brushed as above, then vapor degreased. AA1100 (99.00% Al) and AA1260(99.60% Al) aluminum alloys were used as diffusion barrier alloys because they are the purest aluminum alloys available in welding electrode form. Purer aluminum alloys would provide better protection against diffusion of silicon into the heat treatable core alloy but it is questionable if this added protection (probably small) would be worth the added material cost. Also, as noted above, aluminum-manganese alloys may be used as barriers against silicon penetration.

Examples of Applying Braze Cladding to Core by Arc Spray

Specimens of 0.210" thick, roll cast AA3003 sheet were arc spray coated with AA4047 using the TAFA arc spray equipment described above. Several surface preparations were evaluated. Scratch brushing with and without subsequent solvent cleaning allowed for coatings up to 0.022" thick to be applied without delaminating. Solvent wiping with MEK permitted coating thicknesses of 0.010" without delamination; vapor degreasing permitted coating thicknesses up to 0.018". The coating was applied at the following arc spray parameters: 150 amps, 27 volts, 30 psi atomizing air pressure and a gun-to-work distance of 3"–4".

Five 0.210" thick 3003 Al alloy roll cast sheet specimens were arc spray coated with 0.022" thickness of 4047 Al alloy using the TAFA arc spray equipment with the spray parameters shown above after preparing the surfaces by scratch brushing followed by vapor degreasing. These sheet specimens were cold rolled down to 0.060" with an intermediate anneal at 0.100" gauge. The sprayed coating appeared to be well bonded to the substrate with no evidence of spalling. Preliminary brazing tests showed that the brazing performance of this material was good. However, minimum bend testing showed that the coating cracked and spalled when subjected to moderate to severe bending and the cracks sometimes migrated into the core.

Example of Making Brazed Assembly

The brazed assembly of FIGS. 13a and 13b was achieved in a vacuum brazing apparatus. Furnace hot zone temperature was set at 1110° F. Vacuum was: 1.9×10–5 torr. The unbrazed assembly, held together by an appropriate jig, was inserted into the hot zone and experienced 4 minutes above 1100° F. In that time the vacuum degenerated to approx. 6×10–5 torr.

We claim:

1. A method of making a roll cast, clad sheet material comprised of a cladding of filler material and an aluminum alloy core, comprising the steps, in a roll caster comprising two rolls arranged facing one another at a roll bite, of feeding a band of the filler material along one of the rolls into the roll bite, said band being fed under tension such that said band undergoes longitudinal deformation of greater than about 5%, feeding aluminum alloy for the core, initially in molten state, toward the roll bite, to be solidified by heat extraction, and then hot working the solidified roll cast, clad sheet material.

2. A method as claimed in claim 1, the band of filler material contacting its roll over an arc of contact greater than about 5 degrees.

3. A method as claimed in claim 1, further comprising controlling the percentage thickness of the cladding in the composite sheet material on the basis of the longitudinal deformation of said band being fed under tension.

4. A method as claimed in claim 1, the filler material having a solidus temperature lower than that of the core.

5. A method as claimed in claim 1, the filler material comprising an aluminum brazing alloy.

6. A method as claimed in claim 1, further comprising making the band of filler material by roll casting.

7. A method as claimed in claim 6, the making of the band of filler material including flowing molten metal in a stream into a roll caster roll bite, and alloying by feeding alloying constituents into said stream.

8. A method as claimed in claim 1, the feeding of the aluminum alloy for the core including flowing molten metal in a stream toward the roll bite, and alloying by feeding alloying constituents into said stream.

9. A method as claimed in claim 1, further comprising applying an interlayer between the filler material and the core.

10. A method as claimed in claim 9, the interlayer being anodic with respect to the core.

11. A method as claimed in claim 9, the interlayer comprising barrier means for resisting movement of filler material into the core.

12. A method as claimed in claim 9, wherein the applying of the interlayer includes a step of arc spraying.

13. A method as claimed in claim 1 wherein said band is fed so as to bear tightly against one of said rolls, and further comprising feeding a second band of filler material along the other of said rolls so as to bear tightly against said other of said rolls and into the roll bite.

14. A method as claimed in claim 1, further comprising giving the filler material a pre-heat treatment prior to rolling.

15. A method as claimed in claim 1, further comprising giving the filler material a surface preparation treatment prior to rolling.

16. A method as claimed in claim 15, wherein said treatment comprises an arc cleaning step.

17. A method of making a roll cast, clad sheet material as set forth in claim 1, comprising the step of rolling the material with angulation.

18. A method of making a composite sheet material comprised of a cladding of filler material and an aluminum alloy core, comprising the steps, in a roll caster comprising two rolls arranged facing one another at a roll bite, of feeding a band of the filler material along one of the rolls into the roll bite, feeding aluminum alloy for the core, initially in molten state, toward the roll bite, said aluminum alloy being solidified before entering the roll bite by heat extraction to the rolls and through said band, and placing the band of filler material under tension as it is fed, such that the band of filler material undergoes longitudinal deformation greater than about 5%.

19. A method as claimed in claim 18, further comprising controlling the percentage thickness of the cladding in the composite sheet material on the basis of the longitudinal deformation.

20. The method of claim 18 wherein said longitudinal deformation is between 10% and 60%.

21. The method of claim 18 wherein said longitudinal deformation is greater than 120%.

22. The method of claim 18 wherein said tension is such as to create a tensile stress in the band in the range of about 30 to about 700 psi.

23. In a method of making a composite sheet, in which a core is roll cast in an endless mold system including two facing rolls and a liner is bonded to the core, the improvement comprising applying a material to the liner in a manner such that the material forms an interlayer between the core and the liner and feeding said liner into said rolls under tension such that said liner undergoes longitudinal deformation of greater than about 5%.

24. A method as claimed in claim 23, wherein the improvement further comprises thermal spraying of the material onto the liner.

25. A method as claimed in claim 24, wherein the thermally sprayed material comprises a material anodic with respect to the core.

26. A method as claimed in claim 24, wherein the thermally sprayed material comprises zinc.

27. A method as claimed in claim 24, wherein the thermally sprayed material comprises a barrier material.

* * * * *